(12) United States Patent
Lin et al.

(10) Patent No.: US 11,394,970 B2
(45) Date of Patent: Jul. 19, 2022

(54) IMAGE ENCODING AND DECODING METHOD AND DEVICE

(71) Applicants: Tongji University, Shanghai (CN); ZTE Corporation, Shenzhen (CN)

(72) Inventors: Tao Lin, Shanghai (CN); Ming Li, Shenzhen (CN); Guoqiang Shang, Shenzhen (CN)

(73) Assignee: ZTE Corporation, Guangdong (CN)

( * ) Notice: Subject to any disclaimer, the term of this patent is extended or adjusted under 35 U.S.C. 154(b) by 0 days.

(21) Appl. No.: 16/700,399

(22) Filed: Dec. 2, 2019

(65) Prior Publication Data
US 2020/0280718 A1 Sep. 3, 2020

Related U.S. Application Data

(62) Division of application No. 15/114,278, filed as application No. PCT/CN2014/092718 on Dec. 1, 2014, now abandoned.

(30) Foreign Application Priority Data

Nov. 30, 2013 (CN) .......................... 201310622444.4
Nov. 27, 2014 (CN) .......................... 201410707306.0

(51) Int. Cl.
*H04N 19/119* (2014.01)
*H04N 19/176* (2014.01)
*H04N 19/51* (2014.01)
*H04N 19/517* (2014.01)
*H04N 19/12* (2014.01)
*H04N 19/513* (2014.01)

(52) U.S. Cl.
CPC .......... *H04N 19/119* (2014.11); *H04N 19/12* (2014.11); *H04N 19/176* (2014.11); *H04N 19/51* (2014.11);
(Continued)

(58) Field of Classification Search
CPC .... H04N 19/119; H04N 19/12; H04N 19/176; H04N 19/51; H04N 19/517; H04N 19/521
(Continued)

(56) References Cited

U.S. PATENT DOCUMENTS 6,512,537 B1 * 1/2003 Shimizu ........... G08B 13/19602
348/152
2005/0036759 A1 2/2005 Lin
(Continued)

FOREIGN PATENT DOCUMENTS

| CN | 1260097 A | 7/2000 |
|---|---|---|
| CN | 1663278 A | 8/2005 |
| CN | 102939751 A | 2/2013 |

OTHER PUBLICATIONS

Balle J., et al., "Extended Texture Prediction for H.264/AVC Intra Coding", 31. VCEG Meeting, Jan. 14, 2007, XP030003514.
(Continued)

*Primary Examiner* — Christopher S Kelley
*Assistant Examiner* — Ana Picon-Feliciano
(74) *Attorney, Agent, or Firm* — Perkins Coie LLP

(57) ABSTRACT

The disclosure discloses a method and device for coding an image and a method and device for decoding an image. The coding includes that: a coding block is partitioned into L micro-blocks, wherein L is a preset number of micro-block partitions in the decoding block; Displacement Vectors (DVs) between the micro-blocks and reference micro-blocks in a preset reconstructed pixel sample set are determined, wherein the DVs are vectors between pixel positions of the reference micro-blocks and pixel positions of the micro-blocks in a preset pixel coordinate system: and the DVs are coded and written into a bitstream. By the methods and the devices, the problem of low image compression and decompression efficiency during image coding and decoding in the
(Continued)

related technology is solved, and tire effect of improving image coding and decoding efficiency is further achieved.

22 Claims, 11 Drawing Sheets

(52) U.S. Cl.
CPC ......... *H04N 19/517* (2014.11); *H04N 19/521* (2014.11)

(58) Field of Classification Search
USPC .................................................. 375/240.02
See application file for complete search history.

(56) References Cited

U.S. PATENT DOCUMENTS

| | | | |
|---|---|---|---|
| 2012/0147961 A1 | 6/2012 | Guo | |
| 2013/0003849 A1* | 1/2013 | Chien | H04N 19/52 375/240.16 |
| 2013/0058585 A1* | 3/2013 | Lim | H04N 19/46 382/233 |
| 2013/0163674 A1* | 6/2013 | Zhang | H04N 19/51 375/240.24 |
| 2013/0279583 A1* | 10/2013 | Gao | H04N 19/13 375/240.15 |
| 2016/0241868 A1* | 8/2016 | Li | H04N 19/86 |

OTHER PUBLICATIONS

C-C Chen et al., "AHG8: Line-based Intra Block Copy", 15. JCT-VC Meeting; URL: http://WFTP3.ITU.INT/AV-ARCH/ JCTVC-SITE/, No. JCTVC-O0205-v4, Oct. 27, 2013, XP030115250.

European Search Report for corresponding EP14865962; Report dated Oct. 18, 2016.
Gisquet C., et al., "AHG5: Vextor transformation for Intra Block Copy", 15. JCT-VC Meeting, URL: http://WFTP3.ITU. INT/AV-ARCH/JCTVC-SITE/, No. JCTVC-O0123-v3, Oct. 23, XP030115127.
International Search Report for corresponding application No. PCT/CN2014/092718 filed on Dec. 1, 2014; dated Mar. 2, 2015.
Laroche G. et al., "AHG5: Vector prediction for Intra Block Copy", 15. JCT-VC Meeting; URL: http://WFTP3.ITU,INT/ AV-ARCH/JCTVC-SITE/, No. JCTVC-O0122-v2, Oct. 23, 2013, XP030115125.
Onno P., et al., "AHG5:On the Displacement Vector Prediction Scheme for Intra Block Copy", 17. JCT-VC Meeting, URL: http://WFTP3.ITU.INT/AV-ARCH/JCTVC-SITE/,, No. JCTVC-Q0062-v3, Mar. 29, 2014, XP030115957.
Park C., et al., "AHG5: Intra Motion Vector Copy", 15. JCT-VC Meeting, URL: http://WFTP3.ITU.INT/AV-ARCH/ JCTVC-SITE/, No. JCTVC-O0167-v3, Oct. 25, 2013, XP030115194.
Park C., et al., "Non-RCE3: On the Displacement Vector Prediction Scheme for Intra Block Copy", 16. JCT-VC 8 Meeting, URL: http://WFTP3.ITU.INT/AV-ARCH/JCTVC-SITE/, No. JCTVC-P0102-v3, Jan. 10, 2014, •XP030115592.
C-C Chen et al: 11 Non-SCCE2: Line-based Intra Copy with Unconstrained 2-D BV Coding for Test C11 , 18. Jct-VC Meeting; Jun. 30, 2014-Sep. 7, 2014; Sapporo; (Joint Collaborative Team on Video Coding of ISO/IEC JTC1/SC29/WG11 and ITU-T SG.16 ); URL: HTTP://WFTP3.ITU.INT/AV-ARCH/JCTVC-SITE/, No. JCTVC-R0132, Jun. 20, 2014.
EPO, extended European Search Report for Application No. EP20212240.4; Report dated Jul. 16, 2021.
EPO, Exam Report for Application No. EP14865962; Report dated Jul. 22, 2020.
IP Office China, First Office Action for Application No. CN201410707306.0, dated May 15, 2018.

* cited by examiner

IMAGE ENCODING AND DECODING METHOD AND DEVICE

CROSS REFERENCE TO RELATED APPLICATIONS

This patent document is a division of Ser. No. 15/114,278 filed on Jul. 26, 2016 and claims priority to International Patent Application No. PCT/CN2014/092718, filed on Dec. 1, 2014, which claims the benefit of priority of Chinese Patent Application No. 201410707306.0, filed on Nov. 27, 2014 and Chinese Patent Application No. 201310622444.4 filed on Nov. 30, 2013. The entire contents of the before-mentioned patent applications are incorporated by reference as part of the disclosure of this application.

TECHNICAL FIELD

The disclosure relates to the communications field, and in particular to a method and device for coding an image and a method and device for decoding an image.

BACKGROUND

Along with development and popularization of a new-generation cloud computing and information processing mode and platform adopting a remote desktop as a typical representation form, interconnection among multiple computers, between a computer host and other digital equipment such as a smart television, a smart phone and a tablet personal computer and among various digital equipment has been realized and increasingly becomes a mainstream trend. Therefore, there is an urgent need for real-time screen transmission from a server side (cloud) to a user side at present. Since a large volume of screen video data is required to be transmitted, effective and high-quality data compression for a computer screen image is inevitable.

Fully utilizing a characteristic of a computer screen image for ultrahigh-efficiency compression on the computer screen image is a main aim of the latest international High Efficiency Video Coding (HEVC) standard.

An outstanding characteristic of the computer screen image is that there may usually be many similar and even completely the same pixel patterns in the same frame of image. For example, Chinese or foreign characters usually appearing in computer screen images consist of a few types of basic strokes, and many similar or the same strokes may be found in the same frame of image. Common menus, icons and the like in the computer screen image also have many similar or the same patterns. In an intra prediction manner adopted for an existing image and video compression technology, only an adjacent pixel sample is taken as a reference, and similarity or sameness in the same frame of an image may not be utilized to improve compression efficiency. In an intra motion compensation manner, also called an intra block copy manner, in the related art, intra block matching coding of several blocks with fixed sizes (8×8, 16×16, 32×32 and 64×64 pixels) may not implement accurate matching of various sizes and shapes. While another siring matching manner in the related art has problems of high complexity, large calculated amount, great memory read-write bandwidth and the like although accurate matching of various sizes and shapes may be effectively implemented. Therefore, it is necessary to seek for a new coding tool capable of completely discovering and utilizing similar or the same patterns existing in the computer screen image to greatly improve a compression effect and also controlling complexity, a calculated amount, a memory read-write bandwidth and the like within smaller ranges.

A natural form of a digital video signal of a screen image is a sequence of the image. A frame of image is usually a rectangular area formed by a plurality of pixels, and a digital video signal is a video image sequence, which is also called a video sequence or a sequence sometimes, formed by dozens of and even hundreds of thousands of frames of images. Coding the digital video signal is to code each frame of image.

In the latest international HE VC standard, when a frame of image is coded, the image is divided into a plurality of sub-images called "Coding Units (CUs)" with M×M pixels, and the sub-images are coded one by one by taking a CU as a basic coding unit. M is usually 8, 16, 32 and 64. Therefore, coding a video image sequence is to sequentially code each CU. Similarly, during decoding, each CU is also sequentially decoded to finally reconstruct the whole video image sequence.

In order to achieve adaptability to differences of image contents and properties of each part in a frame of image and pertinently and most effectively perform coding, sizes of each CU in the image may be different, some being 8×8, some being 64×64 and the like. In order to seamlessly splice the CUs with different sizes, the image is usually divided into "Largest Coding Units (LCUs)" with completely the same size and N×N pixels at first, and then each LCU is further divided into multiple CUs of which sizes may not be the same. For example, the image is divided into LCUs with completely the same size and 64×64 pixels (namely N=64) at first, wherein a certain LCU consists of three CUs with 32×32 pixels and four CUs with 16×16 pixels, and another LCU consists of two CUs with 32×32 pixels, three CUs with 16×16 pixels and twenty CUs with 8×8 pixels. Coding the frame of image is to sequentially code CUs one by one.

A colour pixel consists of three components Two most common pixel colour formats include a Green, Blue and Red (GBR) colour formal consisting of a green component, a blue component and a red component and a YUV colour format also called a YCbCr colour format, consisting of a luma component and two chroma components. Therefore, when a CU is coded, the CU may be divided into three component planes (a G plane, a B plane and an R plane or a Y plane, an U plane and a V plane), and the three component planes are coded respectively, and three components of each pixel may also be bundled and combined into a triple, and the whole CU formed by these triples is coded. The former pixel and component arrangement manner is called a planar format of an image (and CUs of the image), and the latter pixel and component arrangement manner is called a packed format of the image (and CUs of the image).

The YUV colour format may also be subdivided into a plurality of sub-formats according to whether to perform down-sampling of a chroma component or not a YUV4:4:4 pixel colour format under which a pixel consists of a Y component, an U component and a V component; a YUV4:2:2 pixel colour format under which two left and right adjacent pixels consist of two Y components, an U component and a V component: and a YUV4:2:0 pixel colour format under which four left, right, upper and lower adjacent pixels arranged according to 2×2 spatial positions consist of four Y components, an U component and a V component. A component is usually represented by a number 8~16 bits. The YUV4:2:2 pixel colour format and the YUV4:2:0 pixel colour format are both obtained by executing chroma component down-sampling on the YUV4:4:4 pixel colour format. A pixel component is also called a pixel sample, or is simply called a sample.

Intra block matching (also called intra motion compensation or intra block copy) coding refers to searching a certain predetermined search range in a reconstructed (including perfectly reconstructed and preliminarily reconstructed to different extents) reference pixel sample set for a matching block (called an optimal matching block) with a minimum matching error with a CU (i.e. a matched block) and then writing a relative position (called a Displacement Vector (DV)) between the matched block and the optimal matching block into a video bitstream during coding of the CU.

Intra block matching decoding refers to determining a position of a matching block in a reconstructed reference pixel sample set in the same frame according to a DV parsed from the video bitstream and then copying and pasting the matching block to a position of the CU (i.e. a matched block) during decoding of the CU.

Intra string matching coding refers to searching a certain predetermined search range in a reconstructed reference pixel sample set in the same frame for at least one optimal variable-length pixel sample matching string, each matching string being represented by a matching relative position (DV) and a matching length, i.e. a pair of (DV, matching length), and then writing at least one pair of (DV, matching length) into the video bitstream daring coding of a CU.

Intra string matching decoding refers to determining (a) position(s) of at least one pixel sample matching string in a reconstructed reference pixel sample set in the same frame according to at least one pair of (DV, matching length) parsed from the video bitstream and then copying and pasting the at least one matching string to a relative position of a CU (i.e. a position of a matched string) during decoding of the CU. The pixel sample number of each copied and pasted matching string is the matching length. The corresponding matched string has the same matching length.

In an ultra block matching manner, each CU has only one DV, which may cause problems of lower matching accuracy and greater matching error to further cause low compression efficiency. On the other hand, in an intra string matching manner, a CU may have too many DVs and matching lengths, which may cause a problem of excessively high bit consumption and may also cause low compression efficiency. Therefore, there exists a problem of low image compression and decompression efficiency during image coding and decoding in the related art.

SUMMARY

The embodiments of disclosure provide a method and device for coding an image, so as to at least solve a problem of low image compression and decompression efficiency during image coding and decoding over a CU in the related art.

In one embodiment of the disclosure, a method for coding an image is provided, which may include step 1): performing micro-block matching coding on original pixels of one input Coding Unit (CU) to generate a group of L optimal Displacement Vectors (DVs), which are matching relative positions or matching distances: that is, dividing the CU into L micro-blocks, and searching, according to a predetermined evaluation criterion, a predetermined search range in a reconstructed reference pixel sample set for L optimal reference micro-blocks relative to the L micro-blocks respectively; wherein the DVs refer to differences between position coordinates of the reference micro-blocks and position coordinates of the micro-blocks, DV is in a unit of a minimum coordinate unit of a pixel sample rather than a micro-block, output of micro-block matching coding includes the L DVs and matching residuals, the matching residuals are differences between numerical values of pixel samples of the reference micro-blocks and numerical values of pixel samples of the micro-blocks, and the DVs are called original DVs; step 2): for each of the L DVs, performing transformation independent of the other DVs, called individual transformation, to remove a part of redundancy existing in each of the L DVs to obtain an individually-transformed DV; step 3): for the whole of the L DVs subjected to the individual transformation, i.e. the whole DV group, performing global transformation with each of the L DVs associated, to obtain DVs subjected to the global transformation, called globally-transformed DVs, to remove a part of redundancy existing in the group of L DVs; and step 4): executing other common coding and reconstruction steps including intra prediction, inter prediction, transformation, quantization, inverse transformation, inverse quantization, entropy coding, de-blocking filtering and/or sample adaptive offset, wherein an input of the step 4) includes an output of step 1), an output of step 3) and the original pixels input in the method, an output of the step 4) includes reconstructed pixels and a bitstream including DV compressed data and other coding results, the reconstructed pixels are put into a reconstructed reference pixel sample buffer area and used as reference pixels needed by a micro-block matching coding step and other common coding and reconstruction steps for a subsequent CU, and the bitstream is also final output of the method.

In another embodiment of the disclosure, a method for decoding an image is provided, which may include: step 1): performing parsing and entropy decoding on a bitstream including Displacement Vector (DV) compressed data and other coding results, and outputting 1) globally-transformed DVs, obtained by the parsing and the entropy decoding, of reference micro-blocks and 2) matching residuals, obtained by the parsing and the entropy decoding, of the reference micro-blocks and other data obtained by the parsing and the entropy decoding, step 2): performing inverse global transformation, with each DV associated, on the whole of L globally-transformed DVs of a current decoding Coding Unit (CU) to obtain and output a group of individually-transformed DVs belonging to the CU; step 3): performing inverse individual transformation independent of the other individually-transformed DVs on each of the individually-transformed DVs to obtain and output L DVs in an original form, i e. original DVs; step 4) performing matching decoding on L micro-blocks of the CU according to L input DVs, that is, calculating positions of the L determined reference micro-blocks according to the DVs and current positions of micro-blocks in the CU in a reconstructed reference pixel sample buffer area, copying all pixel samples of the L reference micro-blocks one by one, and moving and pasting the L reference micro-blocks to the current positions of the L micro-blocks to recover all of the L micro-blocks, wherein DV is in a unit of a minimum coordinate unit of a pixel sample rather than a micro-block, the L micro-blocks are combined together to form the CU, and air output of the step 4) includes the pixel samples of the reconstructed micro-blocks; and step 5): executing other common decoding and reconstruction steps including intra prediction, inter prediction, inverse transformation, inverse quantization, compensation corresponding to prediction residuals and the matching residuals, de-blocking filtering and/or sample adaptive offset, wherein an input of the step 5) includes an output of step 4) and an output 2), i e the other data obtained by the parsing and the entropy decoding, of step 1), an output of the step 5) includes reconstructed pixels, the reconstructed pixels are put into the reconstructed reference pixel sample buffer area and used as reference pixels needed by a subsequent micro-block matching coding step and other common coding and reconstruction steps, and the completely reconstructed pixels are also final output of the method.

In another embodiment of the disclosure, a device for coding an image is provided, which may include the following components: a micro-block matching searching coding component 1), configured to execute micro-block matching coding on pixel samples of an input video image, divide each input Coding Unit (CU) into a group of L micro-blocks, and search, according to a predetermined evaluation criterion, a predetermined search range in a reconstructed reference pixel sample set for L optimal reference micro-blocks relative to the L micro-blocks respectively, wherein a difference between a position coordinate of any reference micro-block and a position coordinate of the corresponding micro-block is a Displacement Vector (DV), DV is in a unit of a minimum coordinate unit of a pixel sample rather than a micro-block, each CU has L DVs in total, an output of the micro-block matching searching coding component includes the DVs and matching residuals, the matching residuals are differences between numerical values of pixel samples of the reference micro-blocks and numerical values of the pixel samples of the micro-blocks, and the DVs are also called original DVs; an individual transformation component 2), configured to, for each of the L DVs, output by the micro-block matching searching coding component 1), of a currently coded CU, perform transformation independent of the other DVs, called individual transformation, to remove a part of redundancy existing in each of the DVs to obtain an individually-transformed DV and output the individually-transformed DVs; a global transformation component 3), configured to perform global transformation, with each DV associated, on the whole of the L individually-transformed DVs output by the individual transformation component 2), i.e. the whole DV group, to obtain DVs subjected to the global transformation, called globally-transformed DVs, to remove a part of redundancy existing in the L DVs of the group, wherein an output of the global transformation component includes the globally-transformed DVs; a coding and reconstruction component 4) based on various other common technologies, configured to execute aiding and reconstruction operation based on various common technologies including intra prediction, inter prediction, transformation, quantization, inverse transformation, inverse quantization, de-blocking filtering and/or sample adaptive offset, wherein an input of the coding and reconstruction component 4) includes an output of the micro-block matching searching coding component 1) and the original pixel samples of the input video image, an output of the coding and reconstruction component 4) includes reconstructed pixels and oilier coding results, and the reconstructed pixels are put into a reconstructed reference pixel sample buffer component 5) and used as reference pixels needed by micro-block matching coding and coding and reconstruction based on various other common technologies for a subsequent CU; the reconstructed reference pixel sample buffer component 5), configured to temporarily store the pixel samples of the reconstructed reference pixel sample set, that is, configured to temporarily store all reconstructed pixel samples till positions of current coding micro-blocks or till a position of the current coding CU in a coding process, which are used as reference pixel samples of micro-blocks in current and subsequent coding, and are also used as reference pixel samples needed by execution of coding and reconstruction operation based on various common technologies on current and subsequent CUs; and an entropy coding component 6), configured to execute an entropy coding operation on all coding results, including the globally-transformed DVs and the other coding results, needed to be written into a bitstream, wherein an entropy coding result, i.e. the bitstream including DV compressed data and the other coding results, is also final output of the device.

In another embodiment of the disclosure, a device for decoding an image is provided, which may include: an entropy decoding component 1), configured to execute entropy decoding on an input bitstream including Displacement Vector (DV) compressed data and other coding results, parse semantics of various kinds of data obtained by the entropy decoding, send parsed globally-transformed DVs obtained by parsing to an inverse global transformation component 2) and send matching residuals obtained by parsing and other data to a decoding and reconstruction component 5) based on various other common technologies, the inverse global transformation component 2), configured to execute inverse global transformation, with each DV associated, on the whole of the L globally-transformed DVs of a current decoding Coding Unit (CU) to obtain and output a group of individually-transformed DVs belonging to the CU; an inverse individual transformation component 3), configured to execute inverse individual transformation independent of the other individually-transformed DVs on each of the individually-transformed DVs output by the inverse global transformation component 2) to obtain and output L DVs in an original form. i.e. original DVs: a micro-block matching decoding component 4), of which an input includes the DVs output by the inverse individual transformation component 3) and configured to calculate positions of determined reference micro-blocks according to the DVs and positions of current decoding micro-blocks in a reconstructed reference pixel sample set, copy all samples of the reference micro-blocks and move and paste the reference micro-blocks to the positions of the current decoding micro-blocks to reconstruct the micro-blocks, wherein DV is in a unit of a minimum coordinate unit of a pixel sample rather than a micro-block, an output of the micro-block matching decoding component 4) includes the pixel samples of the reconstructed micro-blocks, and the L reconstructed micro-blocks are combined together to form the CU; the decoding and reconstruction component 5) based on various other common technologies, configured to execute decoding and reconstruction operation based on various other common technologies, including intra prediction, inter prediction, inverse transformation, inverse quantization, compensation corresponding to prediction residuals and the matching residuals which is an inverse operation of residual calculation operation, de-blocking filtering and/or sample adaptive offset, on the current decoding micro-blocks or the current decoding CU, wherein an output of the decoding and reconstruction component 5) includes reconstructed pixels, the reconstructed pixels are put into a reconstructed reference pixel sample buffer component 6) and used as reference pixels needed by micro-block matching decoding operation and decoding and reconstruction operation based on various other common technologies for a subsequent CU, and the completely reconstructed pixels are also final output of the device: and the reconstructed reference pixel sample buffer component 6), configured to temporarily store the pixel samples of the reconstructed reference pixel sample set, that is, configured to temporarily store all reconstructed pixel samples till the positions of the current decoding micro-blocks or till a position of the current decoding CU in a decoding process, which are used as reference pixel samples of micro-blocks in current and subsequent decoding, and are also used as reference pixel samples needed by execution of coding and reconstruction operation based on various common technologies on current and subsequent CUs.

In an example embodiment, for an original DV represented by a two-dimensional vector (DV0x, DV0y) and an individually-transformed DV represented by a two-dimensional vector (DV1x, DV1y), inverse individual transformation from the individually-transformed DV to the original DV is a transformation represented by the following equation: (DV0x, DV0y)=(DV1x-X, DV1y-Y), wherein X and Y are two global constants or partition constants, that is, a value range of (DV0x, DV0y) is divided into a limited number of areas, and for (DV0x, DV0y) in each area, X and Y are constant.

In an example embodiment, inverse global transformation includes the following two steps: i) performing the following inverse differential operation on the globally-transformed DVs DVg[1], DVg[2], DVg[3], ..., DVg[L-1] and DVg[L] to obtain DV[1], DV[2], DV[3], ..., DV[L-1] and DV[L]: DV[1]=DVg[1]+DV[0], DV[2]=DVg[2]+DV[1], DV[3]=DVg[3]+DV[2], ... DV[LL-1]=DVg[LL-1]+DV[l-2], and DV[L]=DVg[L]+DV[L-1], wherein DV[0] is a DV of an adjacent or nearby CU or a DV of a micro-block of an adjacent or nearby CU; and 2) inversely sequencing, according to an inverse sequencing rule corresponding to a predetermined re-sequencing rule in global transformation of a coder, DV[1], DV[2], DV[3], ..., DV[L-1] and DV[L] to recover the DV[1], DV[2], DV[3], ..., DV[L-1] and DV[L] into the L DVs DV1, DV2, ..., DVL-1 and DVL.

In an example embodiment, inverse global transformation includes the following two steps: 1) performing inverse horizontal differential operation or inverse vertical differential operation or inverse higher-order differential operation or inverse matrix operation on the globally-transformed DVs in a two-dimensional array form; and 2) inversely sequencing results obtained by the operation in step 1) according to an inverse sequencing rule to recover the results into the L DVs.

In an example embodiment, a DV is represented by a binary group (DVx, DVy), where DVx is a horizontal distance between the corresponding reference micro-block and the corresponding micro-block and DVy is a vertical distance between the corresponding reference micro-block and the corresponding micro block; a DV is also represented by a number DVL called a linear distance, wherein a relationship between the DVL and the DVx an the DVy is as follows: DVL=H×DVx+DVy or DVL=W×DVy+DVx, wherein H is a sufficiently large constant; obviously when DVL=H×DVx+DVy, the DVx and the DVy are respectively a quotient and remainder of DVL+H, and when DVL=W× DVy+DVx, DVx and DVy are respectively a remainder and quotient of DVL+W.

In an example embodiment, micro-block matching is accurate matching, and under such a condition, the marching residuals are 0.

In an example embodiment, micro-block matching is approximate matching, and under such a condition, the matching residuals are not 0.

In an example embodiment, the number U of the micro-blocks in a CU is equal to 4, or equal to 5, or equal to 6, or equal to 7, or equal to 8, or equal to 9, or equal to 10, or equal to 11, or equal to 12, or equal to 13, or equal to 14, or equal to 15, or equal to 16, or equal to any constant from 17 to 32.

In an example embodiment, a CU part in the bitstream including the DV compressed data and the other coding results consists of syntax elements which are loaded with the following information and sequentially arranged: a CU header, a horizontal component of DV1, a vertical component of DV1, a horizontal component of DV2, a vertical component of DV2, ..., a horizontal component of DVL, a vertical component of DVL and the other coding results; or a CU header, a horizontal component of DVL a horizontal component of DV2, ..., a horizontal component of DVL, a vertical component of DVL a vertical component of DV2, a vertical component of DVL and the other coding results; or a CU header, the other coding results, a horizontal component of DVL a vertical component of DVL a horizontal component of DV2, a vertical component of DV2, ..., a horizontal component of DVL and a vertical component of DVL; or a CU header, the other coding results, a horizontal component of DV1, a horizontal component of DV2, ..., a horizontal component of DVL, a vertical component of DVL, a vertical component of DV2, ..., and a vertical component of DVL; or a CU header, the other coding results, a horizontal component of DV1, a vertical component of DV1, a horizontal component of DV2, a vertical component of DV2, ..., a horizontal component of DVL, a vertical component of DVL and more other coding results: or a CU header, the other coding results, a horizontal component of DVL a horizontal component of DV2, ..., a horizontal component of DVL, a vertical component of DVL a vertical component of DV2, ..., a vertical component of DVL and more other coding results.

In another embodiment of the disclosure, a method for coding an image is provided, which may include that: partitioning a coding block into L micro-blocks, wherein L is a preset number of micro-block partitions m the coding block; determining Displacement Vectors (DVs) between the micro-blocks and reference micro-blocks in a preset reconstructed pixel sample set, wherein the DVs are vectors between pixel positions of the reference micro-blocks and pixel positions of the micro-blocks in a preset pixel coordinate system; and coding and writing the DVs into a bitstream.

In an example embodiment, the coding block includes one of: a Coding Unit (CU), a Prediction unit (PU) and a Transform unit (TU).

In an example embodiment, before coding and writing the DVs into the bitstream, the method further includes at least one of the followings: performing individual transformation on the DVs of die micro-blocks in the coding block, and performing global transformation on the DVs of the micro-blocks in the coding block or individual transformation values obtained by performing individual transformation over the DVs of the micro-blocks.

In an example embodiment, performing individual transformation on the DVs of the micro-blocks in the coding block includes correcting the DVs according to a first preset offset.

In an example embodiment, before correcting the DVs according to the first preset offset, the method further includes determining the first preset offset in at least one of the following manners: determining the first preset offset according to the DVs; and determining the first preset offset according to coded coding blocks or coding parameters of coded micro-blocks.

In an example embodiment, performing global transformation on tire DVs of the micro-blocks in the coding block or the individual transformation values obtained by performing individual transformation on the DVs of the micro-blocks includes: determining a first predicted value of the first DV or the first individual transformation value in the DVs of the micro-blocks or the individual transformation values: determining a difference value between the first DV or the first individual transformation value and the corresponding first predicted value; and determining difference values between the other DVs or individual transformation values except the first DV or the first individual transformation value and previous DVs or individual transformation values of the other DVs or individual transformation values.

In an example embodiment, before determining the DVs between the micro-blocks and the reference micro-blocks in the preset reconstructed pixel sample set, the method further includes determining the reference micro-blocks corresponding to the micro-blocks according to a predetermined rule, wherein the predetermined rule includes at least one of: lossless matching under which matching residual values are 0 and lossy matching under which the matching residual values are not 0, wherein the matching residual values are difference values between pixel numerical values of the reference micro-blocks and pixel numerical values of the micro-blocks.

In an example embodiment, the preset number L of micro-block partitions in the coding unit is any integer from 4 to 64.

In another embodiment of the disclosure, a method for decoding an image is provided, which may include that, decoding a bitstream of a decoding block to obtain Displacement Vectors (DVs) of micro-blocks, wherein the decoding block includes L, which is a preset number of micro-block partitions in decoding block, micro-blocks, and the DVs are vectors between pixel positions of reference micro-blocks and pixel positions of the micro-blocks; determining the pixel positions of the reference micro-blocks corresponding to the micro-blocks in a preset reconstructed pixel sample set according to the DVs of the micro-blocks and the pixel positions of the micro-blocks: and decoding the micro-blocks according to the pixel positions of the reference micro-blocks.

In an example embodiment, the decoding block includes one of a Coding Unit (CU), a Prediction unit (PU) and a Transform unit (TU).

In an example embodiment, decoding the bitstream of the decoding block to obtain the DVs corresponding to the micro-blocks includes: parsing the bitstream of the decoding block to obtain parameters of the DVs corresponding to the micro-blocks; obtaining the DVs of the micro-blocks according to the parameters in at least one of manners as follows: performing global transformation on the parameters corresponding to part or all of the DVs of the micro-blocks in the decoding block to obtain the DVs of the micro-blocks; and performing individual transformation on the parameters corresponding to part or all of the DVs of the micro-blocks in the decoding block or parameters obtained by performing global transformation on the parameters corresponding to part or all of the DVs of the micro-blocks in the decoding block to obtain the DVs of the micro-blocks.

In an example embodiment, performing global transformation on the parameters corresponding to part or all of the DVs of the micro-blocks in the decoding block to obtain the DVs of the micro-blocks includes determining a second predicted value of the first parameter in the parameters corresponding to pail or all of the DVs of the micro-blocks in the decoding block; determining a sum of the first parameter and the second predicted value; and determining a sum of the other parameters except the first parameter and the sum determined corresponding to the previous parameter.

In an example embodiment, performing individual transformation on the parameters corresponding to part or all of the DVs of the micro-blocks in the decoding block or the parameters obtained by performing global transformation on the parameters corresponding to part or all of the DVs of the micro-blocks in the decoding block to obtain the DVs of the micro-block includes: correcting, according to a second preset offset, the parameters corresponding to part or all of the DVs of the micro-blocks in the decoding block or the parameters obtained by performing global transformation on the parameters corresponding to part or all of the DVs of the micro-blocks in the decoding block.

In an example embodiment, before correcting, according to the second preset offset, the parameters corresponding to part or all of the DVs of the micro-blocks in the decoding block or the parameters obtained by performing global transformation on the parameters corresponding to part or all of the DVs of the micro-blocks in the decoding block, the method further includes: determining the second preset offset in at least one of the following manners: determining the second preset offset according to the parameters of the DVs; and determining the second preset offset according to decoded micro-blocks or decoding parameters of decoded decoding blocks.

In an example embodiment, the preset number L of micro-block partitions in the coding unit is any integer from 4 to 64.

In another embodiment of the disclosure, a device for coding an image is provided, which may include, a partitioning component, configured to partition a coding block into L micro-blocks, wherein L is a preset number of micro-block partitions in the coding block, a first determination component, configured to determine Displacement Vectors (DVs) between die micro-blocks and reference micro-blocks in a preset reconstructed pixel sample set, wherein the DVs are vectors between pixel positions of the reference micro-blocks and pixel positions of the micro-blocks in a preset pixel coordinate system, and a first coding component, configured to code and write the DVs into a bitstream.

In an example embodiment, the coding block includes one of: a Coding Unit (CU), a Prediction unit (PU) and a Transform unit (TU).

In an example embodiment, further including at least one of an individual transformation component, configured to perform individual transformation on the DVs of the micro-blocks in the coding block: and a global transformation component, configured to perform global transformation on the DVs of the micro-blocks in the coding block or individual transformation values obtained by performing individual transformation on the DVs of the micro-blocks.

In an example embodiment, the individual transformation component includes: a correction element, configured to correct the DVs according to a first preset offset.

In an example embodiment, the individual transformation component further includes: a first determination element, configured to determine the first preset offset in at least one of the following manners: the first preset offset is determined according to the DVs: and the first preset offset is determined according to coded micro-blocks or coding parameters of coded coding blocks.

In an example embodiment, the global transformation component includes a second determination element, configured to determine a first predicted value of the first DV or the first individual transformation value in the DVs of the micro-blocks or the individual transformation values; a third determination element, configured to determine a difference value between the first DV or the first individual transformation value and the corresponding first predicted value; and a fourth determination element, configured to determine difference values between the other DVs or individual transformation values except the first DV or the first individual transformation value and previous DVs or individual transformation values of the other DVs or individual transformation values.

In an example embodiment, further including: a second determination component. configured to determine the reference micro-blocks corresponding to the micro-blocks according to a predetermined rule, wherein the predetermined rule includes at least one of: lossless matching under which matching residual values are 0 and lossy matching under which the matching residual values are not 0, wherein the matching residual values are difference values between pixel numerical values of the reference micro-blocks and pixel numerical values of the micro-blocks.

In an example embodiment, the preset number L of micro-block partitions in the coding unit is any integer from 4 to 64.

In another embodiment of the disclosure, a device for decoding an image is provided, which may include: a first decoding component, configured to decode a bitstream of a decoding block to obtain Displacement Vectors (DVs) of micro-blocks, wherein the decoding block comprises L, a preset number of micro-block partitions in the decoding block, micro-blocks, and the DVs are vectors between pixel positions of reference micro-blocks and pixel positions of the micro-blocks: a third determination component, configured to determine the pixel positions of the reference micro-blocks corresponding to the micro-blocks in a preset reconstructed pixel sample set according to the DVs of the micro-blocks and the pixel positions of the micro-blocks; and a second decoding component, configured to decode the micro-blocks according to the pixel positions of the reference micro-blocks.

In an example embodiment, the decoding block comprises one of a Coding Unit (CU), a Prediction unit (PU) and a Transform unit (TU).

In an example embodiment, the first decoding component comprises: a parsing element, configured to parse the bitstream of the decoding block to obtain parameters of the DVs corresponding to the micro-blocks; an obtaining element, configured to obtain the DVs of the micro-blocks in at least one of manners as follows according to die parameters: global transformation is performed on the parameters corresponding to part or all of the DVs of the micro-blocks in the decoding block to obtain the DVs of the micro-blocks: and individual transformation is performed on the parameters corresponding to part or all of the DVs of the micro-blocks in the decoding block or parameters obtained by performing global transformation on the parameters corresponding to part or all of the DVs of the micro-blocks in the decoding block to obtain the DVs of the micro-blocks.

In an example embodiment, the obtaining element comprises: a first determination subelement, configured to determine a second predicted value of the first parameter in the parameters corresponding to part or all of the DVs of the micro-blocks in the decoding block: a second determination subelement, configured to determine a sum of the first parameter and the second predicted value; and a third determination subelement, configured to determine a sum of the other parameters except the first parameter and the sum determined corresponding to the previous parameter.

In an example embodiment, the obtaining element comprises a correction subelement configured to correct the parameters corresponding to part or all of the DVs of the micro-blocks in the decoding block or the parameters obtained by performing global transformation on the parameters corresponding to part or all of the DVs of the micro-blocks in the decoding block according to a second preset offset.

In an example embodiment, the obtaining element further comprises: a fourth determination subelement, configured to determine the second preset offset in at least one of the following manners: the second preset offset is determined according to the parameters of the DVs; and the second preset offset is determined according to decoded micro-blocks or decoding parameters of decoded decoding blocks.

In an example embodiment the preset number L of micro-block partitions in the decoding block is any integer from 4 to 64.

According to the disclosure, the coding block is divided into the L micro-blocks, wherein L is the preset number of micro-block partitions in the decoding block; the DVs between the micro-blocks and the reference micro blocks in the preset reconstructed pixel sample set are determined, wherein the DVs are vectors between the pixel positions of the reference micro-blocks and the pixel positions of the micro-blocks in the preset pixel coordinate system; and entropy coding is performed on tire DVs, and the DVs are written into the bitstream, so that the problem of low image compression and decompression efficiency during image coding and decoding in the related technology is solved, and the effect of improving image coding and decoding efficiency is further achieved.

BRIEF DESCRIPTION OF THE DRAWINGS

The drawings described here are adopted to provide further understanding of the disclosure, and form a part of the disclosure. Schematic embodiments of the disclosure and description thereof are adopted to explain the disclosure and not intended to form improper limits to the disclosure. In the drawings:

FIG. 18 is a structural schematic diagram of a device for decoding according to an example embodiment of the disclosure.

DETAILED DESCRIPTION

The disclosure will be described below with reference to the drawings and embodiments in detail. It needs to be noted that the embodiments in the disclosure and characteristics in the embodiments may be combined under the condition of no conflicts.

Figure 1:
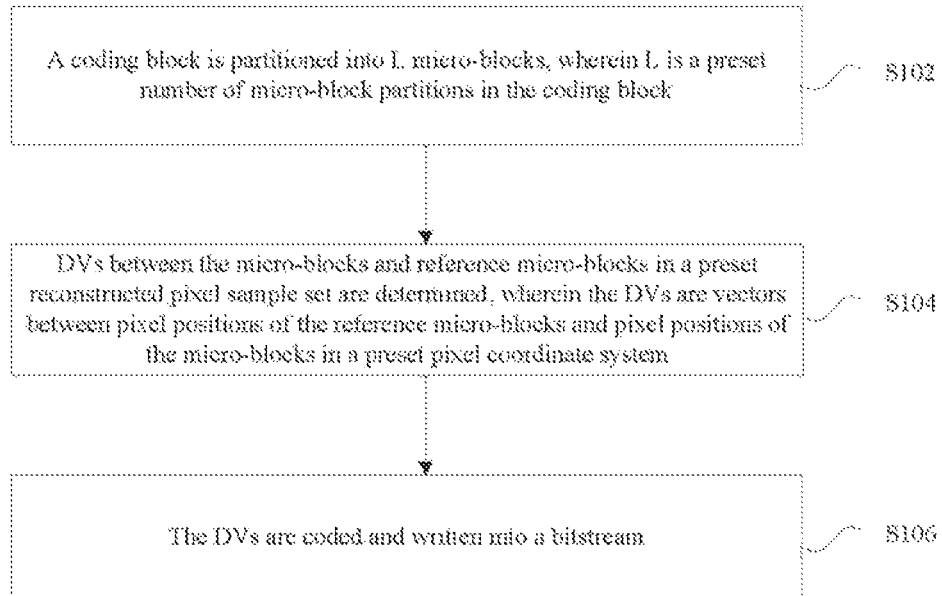
FIG. 1 is a flowchart of a method for coding an image according to an embodiment of the disclosure.

The embodiment provides a method for coding an image, FIG. 1 is a flowchart of the method for coding the image according to an embodiment of the disclosure, and as shown in FIG. 1, the flow includes the following steps. It needs to be noted that "matched micro-blocks" mentioned above or below are more usually called "micro-blocks" and "matching micro-blocks" are more usually called "reference micro-blocks".

Step 102: a aiding block is partitioned into L micro-blocks, wherein is a preset number of micro-block partitions in the coding block, and for example, the preset number L of micro-block partitions in the coding block may be set to be any integer from 4 to 64:

Step 104: DVs between the micro-blocks and reference micro-blocks in a preset reconstructed pixel sample set are determined, wherein the DVs are vectors between pixel positions of the reference micro-blocks and pixel positions of the micro-blocks in a preset pixel coordinate system; and Step 106 the DVs are coded and written into a bitstream.

By the steps, the coding block is partitioned into the L micro-blocks, coding is performed to obtain a bitstream according to relative positions, i.e. the DVs, between the micro-blocks and the reference micro-blocks in the reconstructed pixel sample set, and compared with coding with a aiding block as an element in the related art, which causes the problem of low coding efficiency, coding according to the DVs between the micro-blocks and the reference micro-blocks after the coding block is partitioned into die L micro-blocks has the advantage that the coding efficiency is effectively improved.

It needs to be pointed out that the abovementioned coding block or a decoding block mentioned below refers to a coded or decoded area in a frame of image, and includes one of: a CU, a PU and a TU.

Each of the CU, the PU and the TU at least includes 4×4 pixels or pixel samples, and most usually includes 4×4, 4×8, 8×4, 8×8, 8×16, 16×8, 16×16, 16×32, 32×16, 32×32, 32×64, 64×32 and 64×64 pixels or pixel samples.

It needs to be noted that the most basic element during coding or decoding may be a pixel, may also be a pixel component. A pixel or pixel component serving as the most basic element during coding or decoding is collectively known as a pixel sample, and may also be collectively known as a pixel value sometimes, or may be simply called a sample.

Micro-block matching may also have one of the following aliases: intra micro-block copying and micro-block copying. In addition, DV may also have one of the following aliases: copy position, matching position, position, distance, relative distance, displacement, offset, motion vector, offset, offset vector, block vector, compensation amount, compensation, linear address difference, address difference, relative linear address, address, two-dimensional coordinate difference, coordinate difference, relative coordinate, coordinate and the like.

In order to achieve higher coding efficiency and performance, before the DVs are coded and written into the bitstream, at least one of the following operation may further be executed on the DVs of the micro-blocks: individual transformation is performed on the DVs of the micro-blocks in the coding block; and global transformation is performed on the DVs of the micro-blocks in the coding block or individual transformation values obtained by performing individual transformation on the DVs of the micro-blocks. In an example embodiment, global transformation may be performed on the individual transformation values obtained by performing individual transformation on the DVs of the micro-blocks after individual transformation is performed on the DVs of the micro-blocks, that is, global transformation with each DV allocated is performed on the whole of the L individually-transformed DVs. i.e. the whole DV group. It needs to be noted that "each DV" includes L DVs of a current CU as well as K DVs (K is usually any integer from 1 to 4) of a plurality of adjacent or nearby CUs or a plurality of micro-blocks of the plurality of adjacent or nearby CUs, totally L+K DVs.

In an example embodiment when individual transformation is performed on the DVs of the micro-blocks in die coding block, the following manner may be adopted: the DVs are corrected to obtain sums of the additive offset and input parameters according to a first preset offset, wherein the first preset offset may be obtained in multiple manners, and for example, the first preset offset may be determined in manners as follows: the first preset offset is determined according to the DVs; and the first preset offset is determined according to coding parameters of coded coding blocks or coded micro-blocks.

When global transformation is performed on the DVs of the micro-blocks in the coding block or individual transformation values obtained by performing individual transformation on the DVs of the micro-blocks, multiple manners may also be adopted, and for example, a first predicted value of the first DV or first individual transformation value in the DVs of the micro-blocks or the individual transformation values may be determined at first: then, a difference value between the first DV or the first individual transformation value and the corresponding first predicted value is determined; and finally, difference values between the other DVs or individual transformation values except the first DV or the first individual transformation value and their previous DVs or individual transformation values are determined. In such a manner, the DVs of the micro-blocks are globally transformed into the corresponding difference values.

In addition, before the DVs between the micro-blocks and the reference micro-blocks in the preset reconstructed pixel sample set are determined, the method further includes that; the reference micro-blocks corresponding to the micro-blocks are determined according to a predetermined rule, wherein the predetermined rule may include at least one of: lossless matching under which matching residual values are 0 and lossy matching under which the matching residual values are not 0, and the matching residual values are difference values between pixel numerical values of the reference micro-blocks and pixel numerical values of the micro-blocks. It needs to be noted that selecting the reference micro-blocks here is mainly intended to match a reference micro-block with the smallest error, i.e. an optimal micro-block, in the preset reconstructed pixel sample set to achieve coding accuracy and small error.

Figure 2:
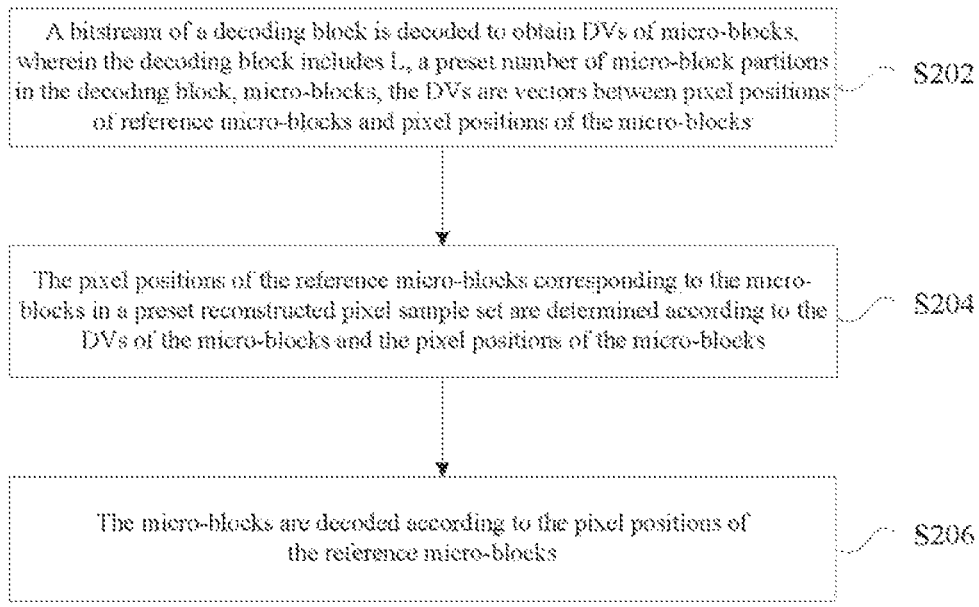
FIG. 2 is a flowchart of a method for decoding an image according to an embodiment of the disclosure.

FIG. 2 is a flow chart of a method for decoding an image according to an embodiment of the disclosure, and as shown in FIG. 2, the flow includes the following steps:

Step 202: a bitstream of a decoding block is decoded to obtain DVs of micro-blocks, wherein the decoding block includes L, a preset number of micro-block partitions in the decoding block, micro-blocks, the DVs are vectors between pixel positions of reference micro-blocks and pixel positions of the micro-blocks, and it needs to be noted that the preset number L may be any integer from 4 to 64;

Step 204: the pixel positions of the reference micro-blocks corresponding to the micro-blocks in a preset reconstructed pixel sample set are determined according to the DVs of the micro-blocks and the pixel positions of the micro-blocks; and Step 206: the micro-blocks are decoded according to the pixel positions of the reference micro-blocks.

By the steps, a coding block is partitioned into the L micro-blocks, decoding is performed to reconstruct the whole coding block according to relative positrons, i.e. the DVs, between the micro-blocks and the reference micro-blocks in the reconstructed pixel sample set, and compared with decoding with the whole decoding block as an element in the related art which causes the problem of low decoding efficiency, decoding according to the DVs between the micro-blocks in the decoding block and tire reference micro-blocks after the decoding block is partitioned into the L micro-blocks has the advantage that the decoding efficiency is effectively improved.

Corresponding to the coding process, the decoding block may also include one of: a CU, a PU and a TU.

In an example embodiment, multiple manners may also be adopted for decoding the bitstream of the decoding block to obtain the DVs corresponding to the micro-blocks, and for example, the bitstream of the decoding block is parsed to obtain parameters of the DVs corresponding to the micro-blocks; the DVs of the micro-blocks are obtained in at least one of manners as follows according to the parameters: global transformation is performed on the parameters corresponding to part or all of the DVs of the micro-blocks in the decoding block to obtain the DVs of die micro-blocks; and individual transformation is performed on the parameters corresponding to part or all of the DVs of the micro-blocks in the decoding block or parameters obtained by performing global transformation on the parameters corresponding to part or all of the DVs of the micro-blocks in the decoding block to obtain the DVs of the micro-blocks.

Moreover, global transformation may be performed on the parameters corresponding to part or all of the DVs of the micro-blocks in the decoding block to obtain the DVs of the micro-blocks in a manner as follows: a second predicted value of the first parameter in tire parameters corresponding to part or all of the DVs of the micro-blocks in the decoding block is determined at first: then a sum of the first parameter and the second predicted value is determined; and finally, a sum of the other parameters except the first parameter and the sum determined corresponding to the previous parameter is determined.

The step that individual transformation is performed on the parameters corresponding to part or all of the DVs of the micro-blocks in the decoding block or the parameters obtained by performing global transformation on the parameters corresponding to part or all of the DVs of the micro-blocks in the decoding block to obtain the DVs of the micro-block includes that the parameters corresponding to part or all of the DVs of the micro-blocks in the decoding block or the parameters obtained by performing global transformation on the parameters corresponding to part or all of the DVs of the micro-blocks in the decoding block are corrected according to a second preset offset.

Moreover, before the step that the parameters corresponding to part or all of the DVs of the micro-blocks in the decoding block or the parameters obtained by performing global transformation on the parameters corresponding to part or all of the DVs of the micro-blocks in the decoding block are corrected according to the second preset offset, the method further includes that, the second preset offset is determined in at least one of manners as follows: the second preset offset is determined according to the parameters of tire DVs, and the second preset offset is determined according to decoded micro-blocks or decoding parameters of decoded decoding blocks.

The embodiment further provides a device for coding an image and a device for decoding an image, which are configured to implement the abovementioned embodiment and example implementation modes, and what has been described will not be elaborated. For example, term "component", used below, is a combination of software and/or hardware capable of realizing a preset function. The devices described in the following embodiment are preferably implemented by software, but implementation of the devices with hardware or the combination of software and hardware is also possible and conceivable.

Figure 3:
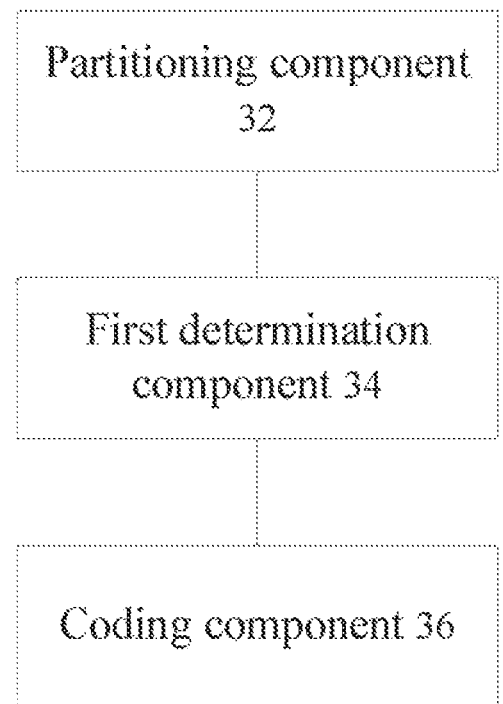
FIG. 3 is a structural block diagram of a device for coding an image according to an embodiment of the disclosure.

FIG. 3 is a structure block diagram of an image coding device according to an embodiment of the disclosure, and as shown in FIG. 3, the device includes a division component 32, a first determination component 34 and a coding component 36. The device will be described below.

The division component 32 is configured to partition a coding block into L micro-blocks, wherein L a preset number of micro-block partitions in the coding block, and L may be any integer from 4 to 64; the first determination component 34 is connected to the partition component 32, and is configured to determine DVs between the micro-blocks and reference micro-blocks in a preset reconstructed pixel sample set, wherein the DVs are vectors between pixel positions of the reference micro-blocks and pixel positions of the micro-blocks in a preset pixel coordinate system; and the coding component 36 is connected to the first determination component 34, and is configured to code and write the DVs into a bitstream.

In an example embodiment, the coding block may include one of: a CU, a PU raid a TU.

Figure 4:
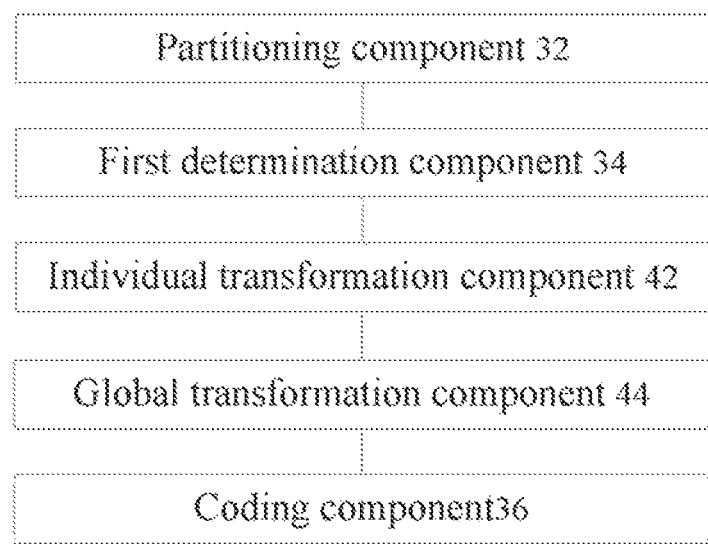
FIG. 4 is a structural block diagram of a device for coding an image according to a first example embodiment of the disclosure.

FIG. 4 is a structural block, diagram of a device for coding an image according 10 an embodiment of the disclosure, and as shown in FIG. 4, the device may further include, except all the components shown in FIG. 3, at least one of; an individual transformation component 42 and a global transformation component 44. The device will be described below. It needs to be noted that FIG. 4 only shows the condition that the device includes both the individual transformation component 42 and the global transformation component 44.

The individual transformation component 42 is configured to perform individual transformation on the DVs of the micro-blocks in the coding block; and the global transformation component 44 is configured to perform global transformation on the DVs of the micro-blocks in the coding block or individual transformation values obtained by performing individual transformation on the DVs of the micro-blocks.

Figure 5:
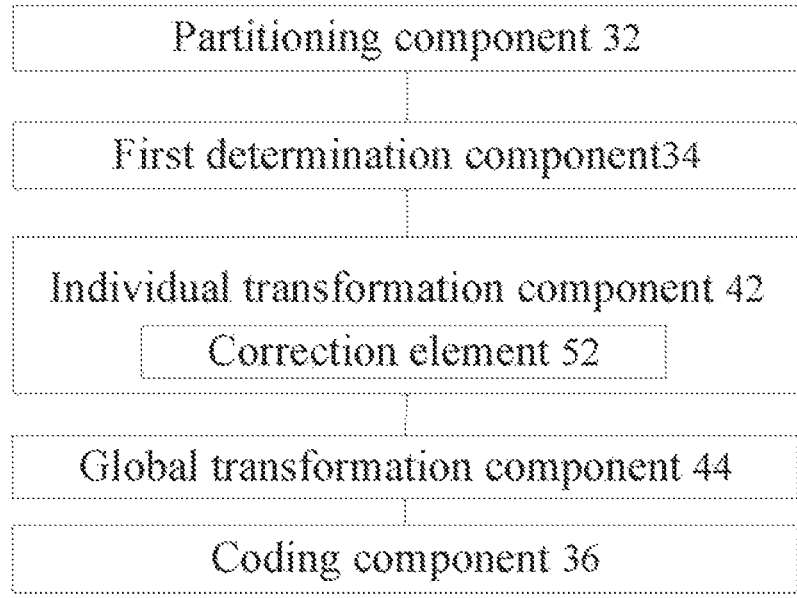
FIG. 5 is a structural block diagram of an individual transformation component 42 in the device for coding the image according to a first example embodiment of the disclosure.

FIG. 5 is a structural block diagram of the individual transformation component 42 in the device for coding the image according to a first embodiment of the disclosure, and as shown in FIG. 5, the individual transformation component 42 includes: a correction component 52. The correction element 52 will be described below.

The correction element 52 is configured to correct the DVs according to a first preset offset.

Figure 6:
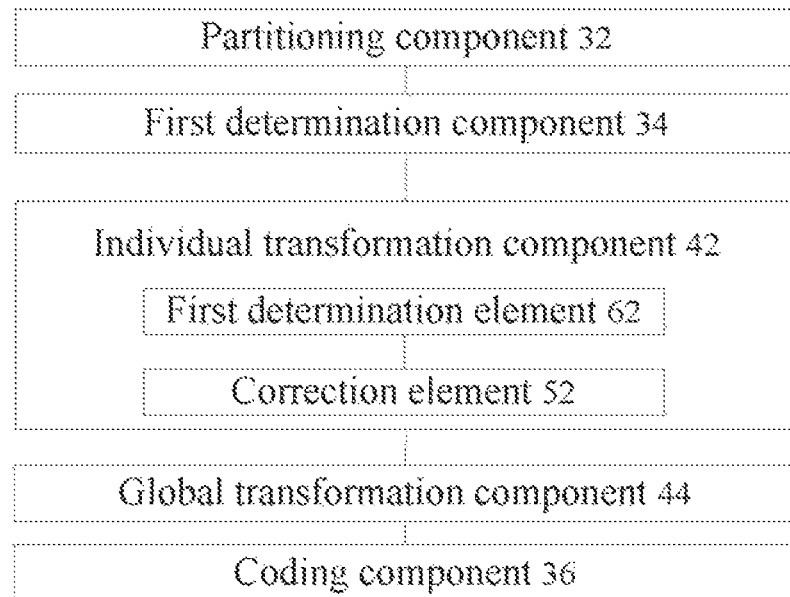
FIG. 6 is a structural block diagram of an individual transformation component 42 in the device for coding the image according to a second example embodiment of the disclosure.

FIG. 6 is a structural block diagram of the individual transformation component 42 in the device for coding the image according to a second embodiment of the disclosure, and as shown in FIG. 6, the individual transformation component 42 further includes, except the correction element 52 shown in FIG. 5; a first determination element 62. The first determination element 62 will be described below.

The first determination element 62 is connected to the correction element 52, and is configured to determine the first preset offset in at least one of manners as follows; die first preset offset is determined according to the DVs; and the first preset offset is determined according to coding parameters of coded coding blocks or coded micro-blocks.

Figure 7:
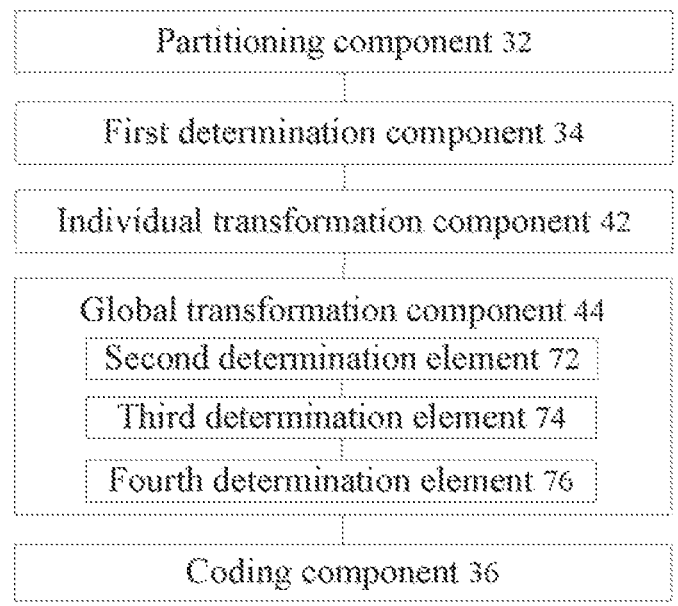
FIG. 7 is a structural block diagram of a global transformation component 44 in a device for coding an image according to an example embodiment of the disclosure.

FIG. 7 is a structural block diagram of the global transformation component 44 in the device for coding the image according to an embodiment of the disclosure, and as shown in FIG. 7, the global transformation component 44 includes a second determination element 72, a third determination element 74 and a fourth determination element 76. The global transformation component 44 will be described below.

The second determination element 72 is configured to determine a first predicted value of the first DV or first individual transformation value in the DVs of the micro-blocks or the individual transformation values, the third determination element 74 is connected to the second determination element 72, and is configured to determine a difference value between the first DV or the first individual transformation value and the corresponding first predicted value, and the fourth determination element 76 is connected to the third determination element 74, and is configured to determine difference values between the other DVs or individual transformation values except the first DV or the first individual transformation value and their previous DVs or individual transformation values.

Figure 8:
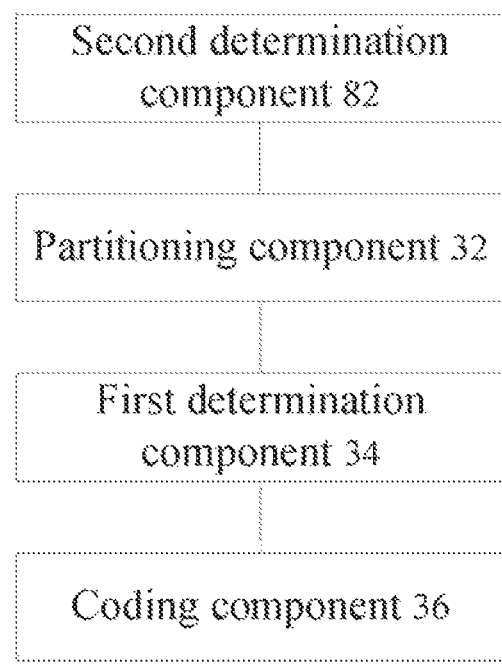
FIG. 8 is a structural block diagram of a device for coding an image according to a second example embodiment of the disclosure.

FIG. 8 is a structural block diagram of the device for coding the image according to a second example embodiment of the disclosure, and as shown in FIG. 8, the device further includes, except all the components shown in FIG. 3: a second determination component 82. The second determination component 82 will be described below.

The second determination component 82 is connected to the partition component 32 and the first determination component 34, and is configured to determine the reference micro-blocks corresponding to the micro-blocks according to a predetermined rule, wherein the predetermined rule includes at least one of; lossless matching under which matching residual values are 0 and lossy matching under which the matching residual values are not 0, wherein the matching residual values are difference values between pixel numerical values of the reference micro-blocks and pixel numerical values of the micro-blocks.

Figure 9:
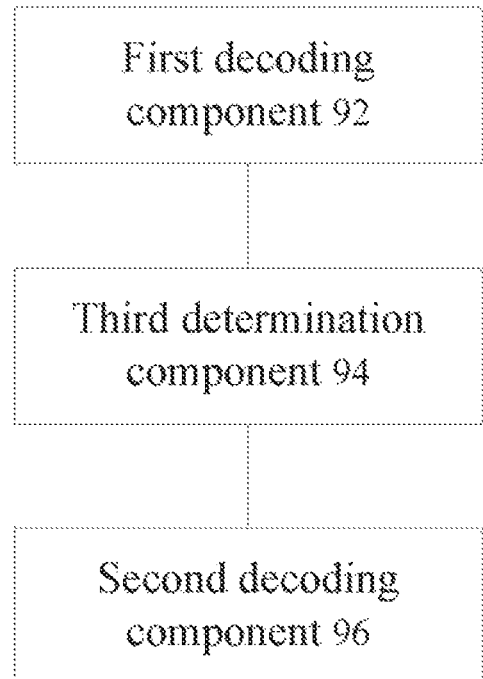
FIG. 9 is a structural block diagram of a device for decoding an image according to an embodiment of the disclosure.

FIG. 9 is a structural block diagram of a device for decoding an image according to an embodiment of the disclosure, and as shown in FIG. 9, tire device includes a first decoding component 92, a third determination component 94 and a second decoding component 96. The device will be described below.

The first decoding component 92 is configured to decode a bitstream of a decoding block to obtain DVs of micro-blocks, wherein the decoding block includes L, a preset number of micro-block partitions in the decoding block, micro-blocks, the DVs are vectors between pixel positions of reference micro-blocks and pixel positions of the micro-blocks, and L may be any integer from 4 to 64; the third determination component 94 is connected to the first decoding component 92, and is configured to determine the pixel positions of the reference micro-blocks corresponding to the micro-blocks in a preset reconstructed pixel sample set according to the DVs of the micro-blocks and the pixel positions of the micro-blocks; and the second decoding component 96 is connected to the third determination component 94, and is configured to decode the micro-blocks according to the pixel positions of the reference micro-blocks.

In an example embodiment, the decoding block may include one of a CU, a PU and a TU.

Figure 10:
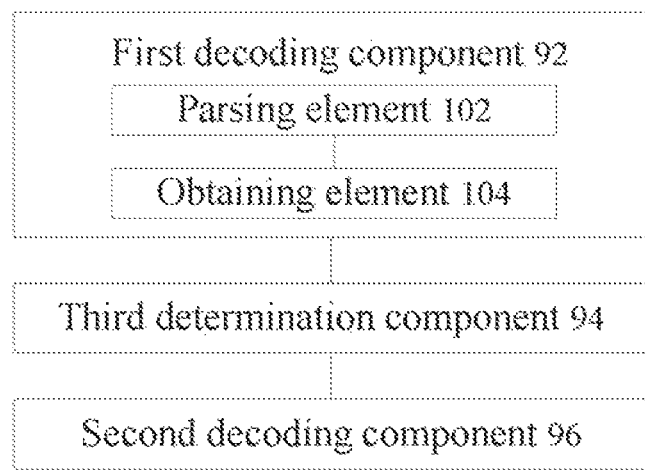
FIG. 10 is a structural block diagram of a first decoding component 92 in a device for decoding an image according to an example embodiment of the disclosure.

FIG. 10 is a structural block diagram of the first decoding component 92 in the device for decoding lire image according to an embodiment of the disclosure, and as shown in FIG. 10, the first decoding component 92 includes, a parsing element 102 and an obtaining element 104. The first decoding component 92 will be described below.

The parsing element 102 is configured to parse the bitstream of the decoding block to obtain parameter of the DVs corresponding to the micro-blocks; the obtaining element 104 is connected to the parsing element 102, and is configured to obtain the DVs of the micro-blocks in at least one of manners as follows according to the parameters: global transformation is performed on the parameters corresponding to pan or all of the DVs of the micro-blocks in the decoding block to obtain the DVs of the micro-blocks; and individual transformation is performed on the parameters corresponding to pan or all of the DVs of the micro-blocks tn the decoding block or parameters obtained by performing global transformation on the parameters corresponding to part or all of the DVs of the micro-blocks in the decoding block to obtain the DVs of the micro-blocks.

Figure 11:
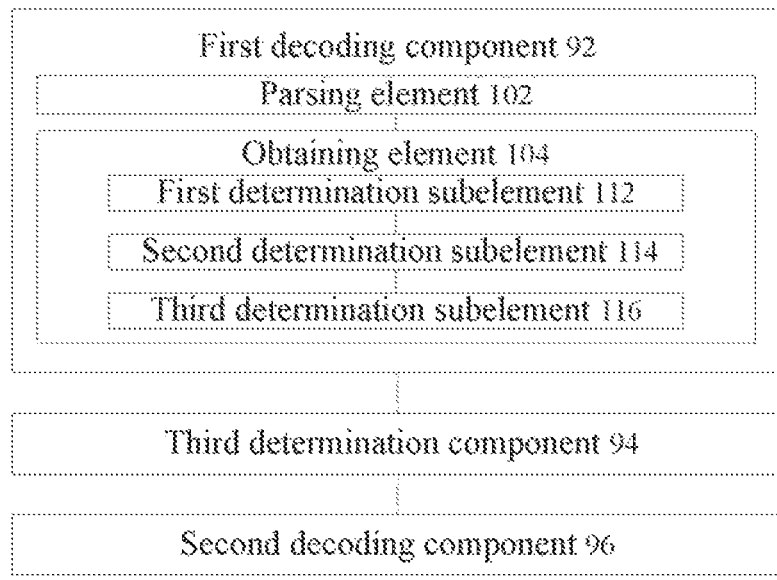
FIG. 11 is a first preferred structure block diagram of an obtaining element 104 in a first decoding component 92 in an image decoding device according to a first example embodiment of the disclosure.

FIG. 11 is a structural block diagram of the obtaining element 104 in the first decoding component 92 in the device for decoding the image according to a first example embodiment of the disclosure, and as shown in FIG. 11, the obtaining element 104 includes a first determination subelement 112, a second determination subelement 104 and a third determination subelement 116. The obtaining element 104 will be described below.

The first determination subelement 112 is configured to determine a second predicted value of the first parameter in the parameters corresponding to part or all of the DVs of the micro-blocks in the decoding block; the second determination subelement 114 is connected to the first determination subelement 112, and is configured to determine a sum of the first parameter and the second predicted value; and the third determination subelement 116 is connected to the second determination subelement 114, and is configured to determine a sum of the other parameters except the first parameter and sums determined corresponding to the previous parameter.

Figure 12:
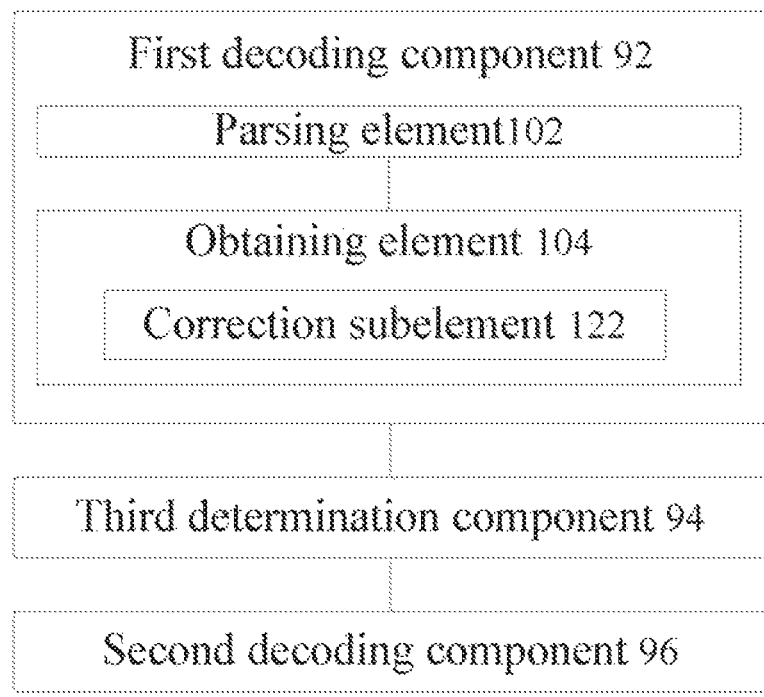
FIG. 12 is a structural block diagram of the obtaining element 104 in the first decoding component 92 in the device for decoding the image according to a second example embodiment of the disclosure.

FIG. 12 is a structural block diagram of the obtaining element 104 in the first decoding component 92 in the device for decoding the image according to a second example embodiment of the disclosure, and as shown in FIG. 12, the obtaining element 104 includes: a correction subelement 122. The correction subelement 122 will be described below.

The correction subelement is configured to correct the parameters corresponding to part or all of the DVs of the micro-blocks in the decoding block or the parameters obtained by performing global transformation on the parameters corresponding to part or all of the DVs of the micro-blocks in the decoding block according to a second preset offset.

Figure 13:
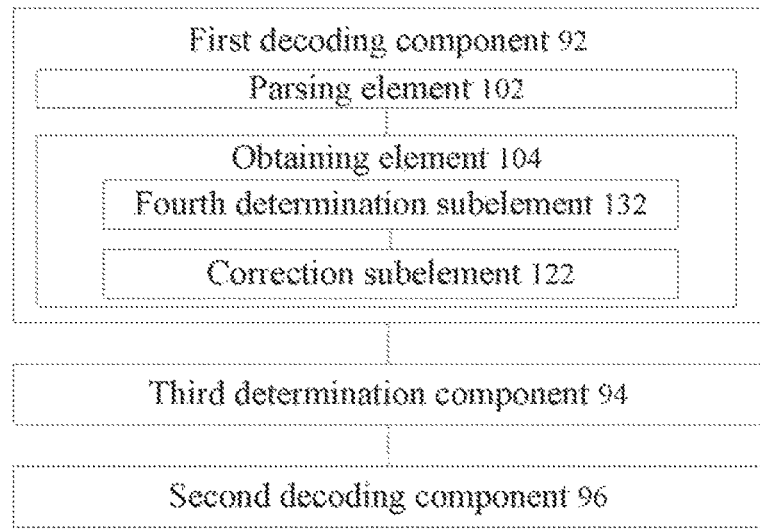
FIG. 13 is a structural block diagram of the obtaining element 104 in the first decoding component 92 in the device for decoding the image according to a third example embodiment of the disclosure.

FIG. 13 is a structural block diagram of the obtaining element 104 in the first decoding component 92 in tire device for decoding the image according to a third example embodiment of the disclosure, and as shown in FIG. 13, the obtaining element 104 further includes, except the correction subelement 122 shown in FIG. 12: a fourth determination subelement 132. The obtaining element 104 will be described below.

The fourth determination subelement 132 is connected to die correction subelement 122, and is configured to determine the second preset offset in at least one of manners as follows: the second preset offset is determined according to the parameters of the DVs; and the second preset offset is determined according to decoding parameters of decoded decoding blocks or decoded micro-blocks.

An example embodiment of the disclosure will be described below with reference to specific operation modes.

Figure 14:
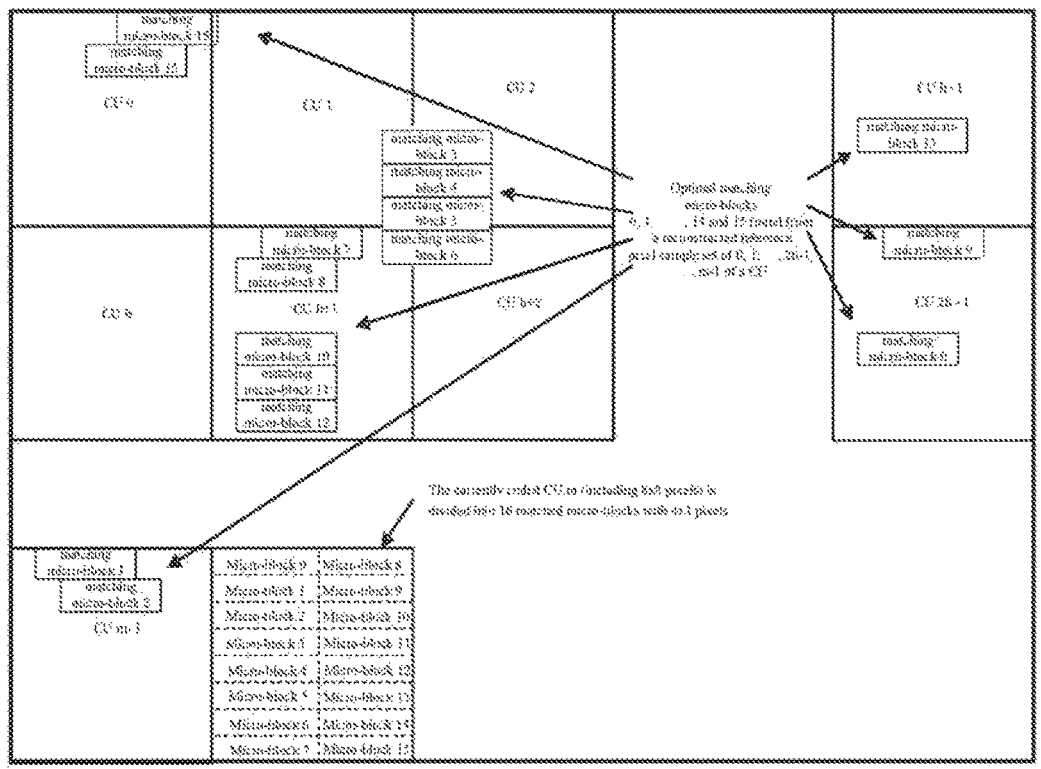
FIG. 14 is a schematic diagram of division of a CU into a group of L micro-blocks, micro-block matching coding and decoding, sizes of the micro-blocks, matching micro-blocks and matched micro-blocks according to an example embodiment of the disclosure.

FIG. 14 is a diagram of partitioning a CU into a group of L micro-blocks, micro-block matching coding and decoding, sizes of the micro-blocks, mat clung micro-blocks and matched micro-blocks according to an example embodiment of the disclosure, wherein, descriptions are made with the condition that a coding block is a CU as an example, as shown in FIG. 14. Matching micro-blocks and matched micro-blocks in FIG. 14 may be matching micro-blocks and matched micro-blocks in a packed format, and may also be matching micro-blocks and matched micro-blocks of a component (sample) in a planar format. Therefore, methods and devices of the example embodiment of the disclosure may be applicable to coding and decoding of pixels of an LCU and CU in the packed format, and may also be applicable to coding and decoding of pixel samples in a plane of an LCU and CU in the planar format. A micro-block in FIG. 14 consists of 4×1=4 pixels of pixel samples with a width of 4 and a height of 1, and is called a 4×1 micro-block. However, micro-blocks with other sizes may also be adopted in the example embodiment of the disclosure, such as a 2×1 micro-block consisting of 2×1=2 pixels or pixel samples with a width of 2 and a height of 1, or a 1×2 micro-block consisting of 1×2=2 pixels or pixel samples with a width of 1 and a height of 2, or a 2×2 micro-block consisting of 2×2=4 pixels or pixel samples with a width of 2 and a height of 2, or a 1×4 micro-block consisting of a 1×4=4 pixels or pixel samples with a width of 1 and a height of 4, or a 4×2 micro-block consisting of 4×2=8 pixels or pixel samples with a width of 4 and a height of 2.

In the method and device for coding of preferable embodiment of the disclosure, the most basic peculiar technical characteristic is that a current CU is partitioned into a group of L (L≥4 usually) micro-blocks, called micro-blocks to be matched, when the current CU is coded a coded and reconstructed (including perfectly reconstructed and partially reconstructed to different extents) historical pixel sample set (also called a reconstructed reference pixel sample set) is searched, and L optimal matching micro-blocks matched with the L micro-blocks of the current CU by taking a micro-block as a matching element. Each matching micro-block is represented by a parameter, i.e. a DV (relative position or distance between the matching micro-block and the corresponding matched micro-block in the current CU). Starting positions of the matching micro-blocks may be positions of any pixel samples or pixels in the reconstructed reference pixel sample set, and are unrelated to sizes of the micro-blocks and unlimited by the sizes of the micro-blocks. That is, an element of the DVs is not a micro-block but a pixel sample or pixel. The most basic peculiar technical characteristic of the example embodiment of the disclosure further includes that, for each of the L DVs, transformation independent of the other DVs, called individual transformation, is performed to remove a part of redundancy existing in each DV. Global transformation with each DV associated is performed on the whole of the L individually-transformed DVs, i.e. the whole DV group, to remove a pail of redundancy existing between these DVs. Entropy coding is performed on the DVs (called globally-transformed DVs) subjected to individual transformation and global transformation to obtain final DV compressed data. The DV compressed data is a part of an output video bitstream of the method and device for coding.

In the method and device for decoding of the example embodiment of the disclosure, the most basic peculiar technical characteristic is that DV compressed data is read from bitstream data when the bitstream data of a current decoding CU is decoded, entropy decoding is performed to obtain globally-transformed DVs, and then inverse global transformation and inverse individual transformation are performed to obtain a group of L DVs, in an original form, of the current decoding CU. The L DVs correspond to L matched micro-blocks of the current decoding CU. Positions of matching micro-blocks in a reconstructed reference pixel sample set are calculated according to positions of the matched micro-blocks and the DVs. Then, the matching micro-blocks are copied in the reconstructed reference pixel sample set, and the matching micro-blocks are moved raid pasted to the positions of the matched micro-blocks in the current decoding CU to reconstruct the matched micro-blocks. The L matching micro-blocks are copied, moved and pasted in such a manner to finally reconstruct all pixel samples of the whole current decoding CU. Like coding, a starting position of each matching micro-blocks may be a position of any pixel sample in the reconstructed reference pixel sample set, and is unrelated to a size of live micro-block and unlimited by the size of the micro-block. Thai is, an element of the DVs is not a micro-block but a pixel sample. On the other hand, starting positions of the matched micro-blocks in the current decoding CU are always L positions determined by taking a micro-block as an element, and may not be the positions of any pixel samples.

Figure 15:
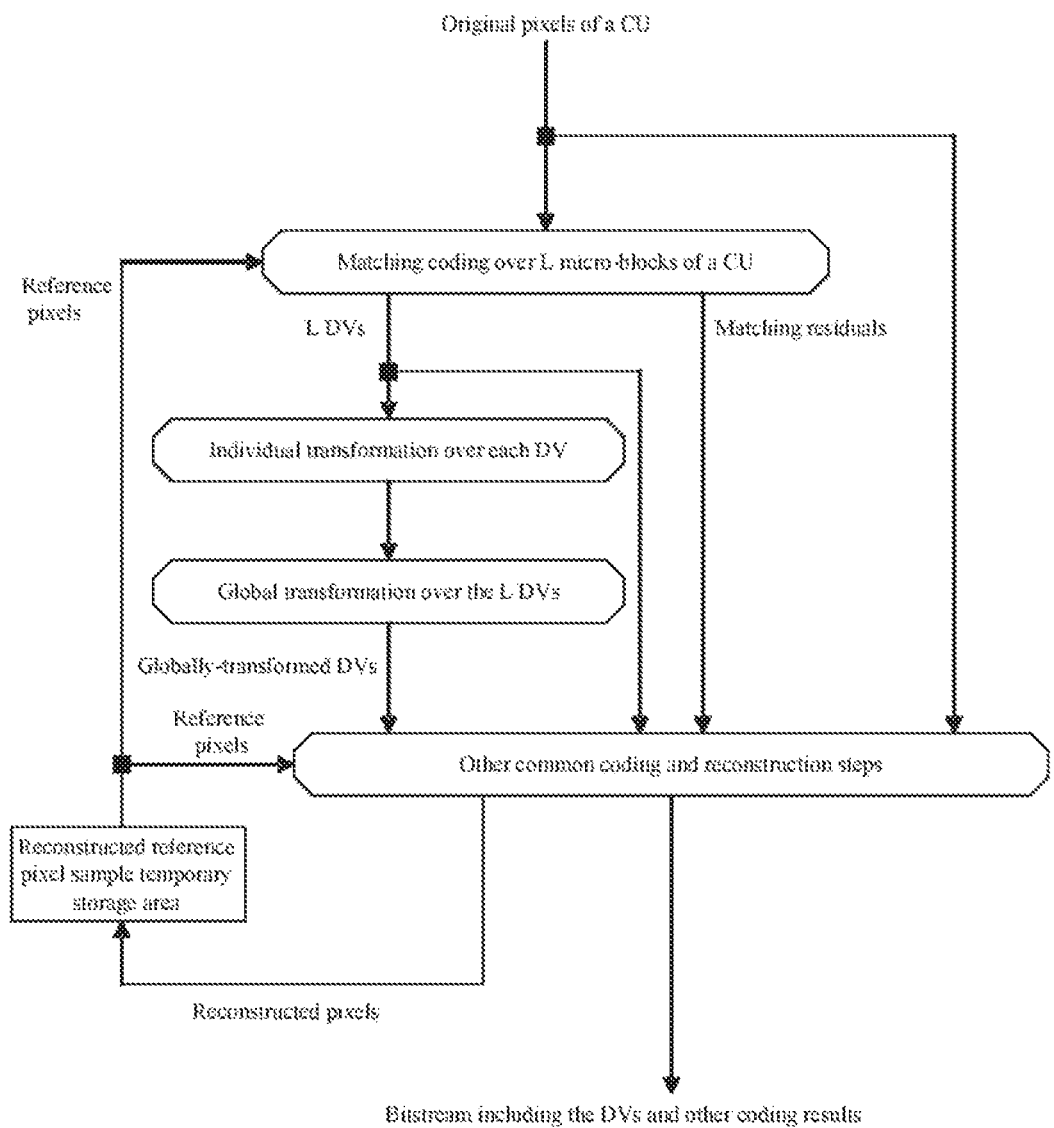
FIG. 15 is a flowchart of a method for coding according to an example embodiment of the disclosure.

FIG. 15 is a flowchart of a method for coding according to an example embodiment of the disclosure, and as shown in FIG. 15, the method for coding of the example embodiment of the disclosure includes the following steps:

micro-block matching coding is performed on original pixels of an input CU to generate a group of L (L≥4 usually) optimal DVs, i.e. matching relative positions or matching distances, employing a pixel sample as an element that is, the CU is partitioned into L micro-blocks, called micro-blocks to be matched, and a predetermined search range in a reconstructed reference pixel sample set is searched, according to a predetermined evaluation criterion, for L optimal matching micro-blocks relative to the L matched micro-blocks respectively, wherein the DVs refer to differences between position coordinates of the matching micro-blocks and position coordinates of the matched micro-blocks, an element of the DVs is not a micro-block but a minimum coordinate element of a pixel sample (whole pixel sample or ½, ¼ and ⅛ pixel sample), output of micro-block matching coding includes the L DVs and matching residuals, the matching residuals are differences between numerical values of pixel samples of the matching micro-blocks and numerical values of pixel samples of the matched micro-blocks, and the DVs are called original DVs;

for each of the L DVs, transformation independent of the oilier DVs, called individual transformation, is performed to remove a part of redundancy existing in each of the L DVs to obtain an individually-transformed DV:

global transformation with each of the L DVs associated is performed on the whole of the L DVs subjected to individual transformation (i.e. the individually-transformed DVs), i.e. the whole DV group, to obtain DVs subjected to global transformation, called globally-transformed DVs, to remove a part of redundancy existing in the L DVs of the group; and other common coding and reconstruction steps such as intra prediction, inter prediction, transformation, quantization, inverse transformation, inverse quantization, entropy coding (including entropy coding over the globally-transformed DVs), de-blocking filtering and sample adaptive offset are executed, wherein input of the step includes the output of Step 1), output of Step 3) and the original pixels input in the coding method, output of the step includes reconstructed pixels and a bitstream including DV compressed data and other coding results, the reconstructed pixels are put into a reconstructed reference pixel sample buffer area and configured as reference pixels needed by a micro-block matching coding step and other common coding and reconstruction steps for a subsequent CU, and the bitstream is also final output of the method for coding.

Figure 16:
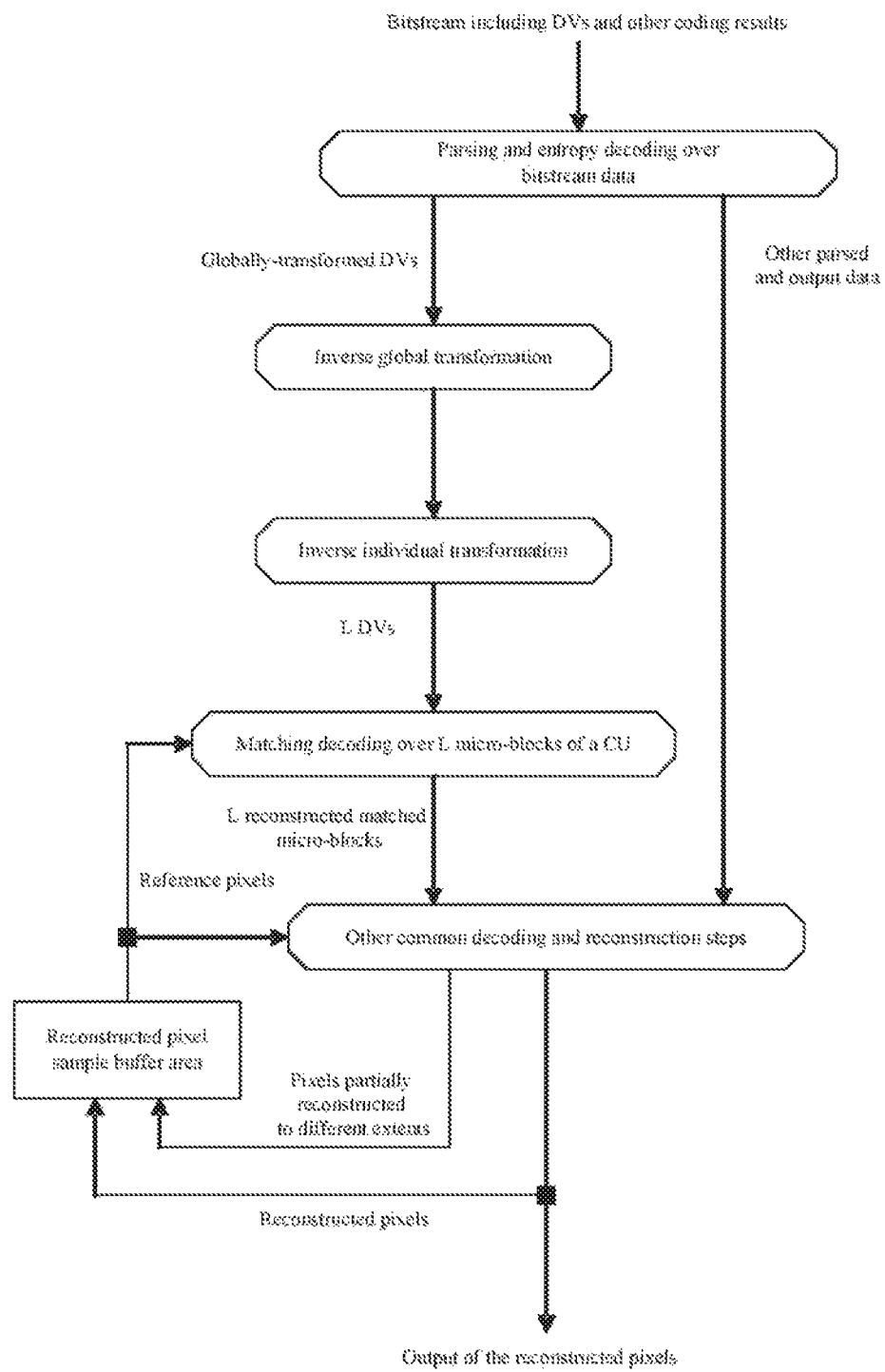
FIG. 16 is a flowchart of a method for decoding according to air example embodiment of the disclosure.

FIG. 16 is a flowchart of a method for decoding according to an example embodiment of the disclosure, and as shown in FIG. 16, the method for decoding of the example embodiment of the disclosure includes the following steps:

parsing and entropy decoding are performed on a bitstream including DV compressed data and other coding results, and 1) globally-transformed DVs, obtained by the parsing and the entropy decoding, of matching micro-blocks and 2) matching residuals, obtained by the parsing and the entropy decoding, of the matching micro-blocks and other data obtained by the parsing and the entropy decoding are output;

inverse global transformation with each DV associated is performed on the whole of the L globally-transformed DVs of a current decoding CU to obtain and output a group of individually-transformed DVs belonging to the CU;

inverse individual transformation independent of the other individually-transformed DVs is performed on each of the individually-transformed DVs to obtain and output L DVs in an original form. i.e. original DVs;

matching decoding is performed on L micro-blocks of the CU according to L input DVs, that is, positions of the L determined matching micro-blocks are calculated according to the DVs and current positions of matched micro-blocks in the CU in a reconstructed reference pixel sample buffer area, all pixel samples of the L matching micro-blocks are copied one by one, and the L matching micro-blocks are moved and pasted to the current positions of the L matched micro-blocks to reconstruct all of the L matched micro-blocks, wherein an element of the DVs is not a micro-block but a minimum coordinate element of a pixel sample (whole pixel sample or ½, ¼ and ⅛ pixel sample), the L matched micro-blocks are combined together to form the CU, and output of the step includes the pixel samples of the reconstructed matched micro-blocks; and other common decoding and reconstruction steps such as intra prediction, inter prediction, inverse transformation, inverse quantization, compensation corresponding to prediction residuals and the matching residuals (inverse operation of residual calculation operation), de-blocking filtering and sample adaptive offset are executed, wherein input of the step includes the output of Step 4) and output, i.e. the other data obtained by parsing and entropy decoding, of Step 1), output of the step includes reconstructed pixels (including perfectly reconstructed pixels and pixels partially reconstructed to different extents), the reconstructed pixels are put into the reconstructed reference pixel sample buffer area and configured as reference pixels needed by a subsequent micro-block matching coding step and other common coding and reconstruction steps, and the perfectly reconstructed pixels are also final output of the method for decoding.

Figure 17:
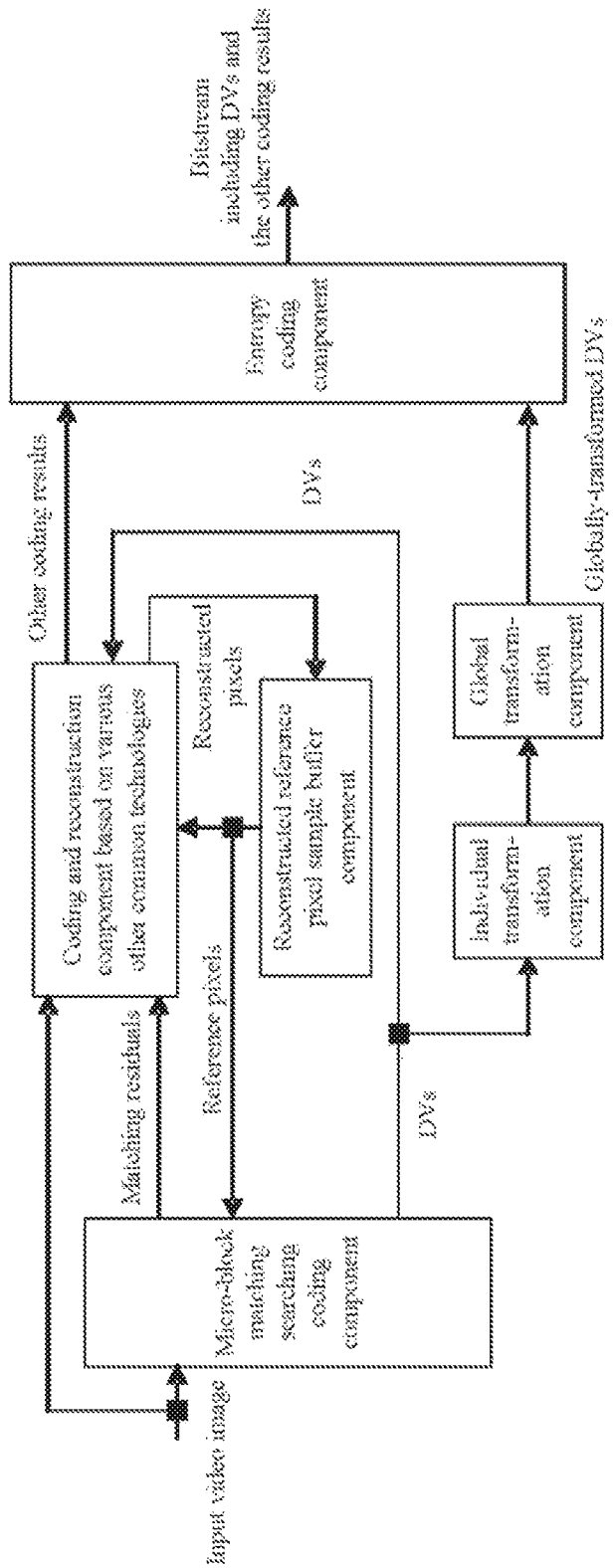
FIG. 17 is a structural schematic diagram of a device for coding according to an example embodiment of the disclosure.
Figure 19:
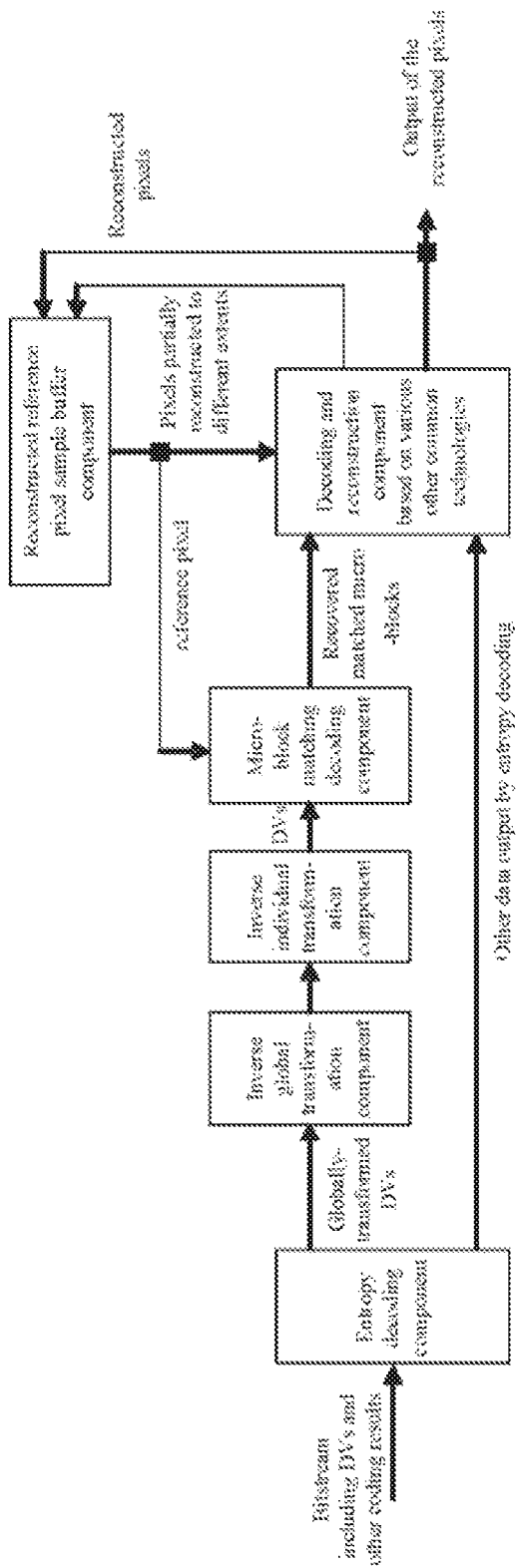

FIG. 17 is a structural diagram of a device for coding according to an example embodiment of the disclosure, and as shown in FIG. 17, the whole device for coding consists of the following components:

a micro-block matching searching coding component (with a function the same as that of the first determination component 34): which executes micro-block matching coding on pixel samples of an input video image, partitions each input CU into a group of L micro-blocks, called micro-blocks to be matched, and searches, according to a predetermined evaluation criterion, a predetermined search range in a reconstructed reference pixel sample set for L optimal matching micro-blocks relative to the L matched micro-blocks respectively, wherein a difference between a position coordinate of any matching micro-block and a position coordinate of the corresponding matched micro-block is a DV, an element of the DVs is not a micro-block but a minimum coordinate element of a pixel sample (whole pixel sample or ½, ¼ and ⅛ pixel sample), each CU hits totally L DVs, output of the micro-block matching searching coding component includes the DVs and matching residuals, the matching residuals are differences between numerical values of pixel samples of the reference micro-blocks and numerical values of the pixel samples of the micro-blocks, and the DVs are also called original DVs:

an individual transformation component (with a function the same as that of the individual transformation component 42): which, for each of the L DVs, output by micro-block matching searching coding component 1), of a current coding CU, performs transformation independent of the other DVs, called individual transformation, to remove a part of redundancy existing in each of the DVs to obtain an individually-transformed DV and outputs the individually-transformed DVs;

a global transformation component (with a function the same as that of the global transformation component 44): which performs global transformation with each DV associated on the whole of the L individually-transformed DVs output by the individual transformation component 2), i.e. the whole DV group, to obtain DVs subjected to global transformation, called globally-transformed DVs, to remove a part of redundancy existing in the L DVs of the group, wherein output of the individual transformation component component includes the globally-transformed DVs;

a coding and reconstruction component based on various other common technologies: which executes aiding and reconstruction operation based on various common technologies such as intra prediction, inter prediction, transformation, quantization, inverse transformation, inverse quantization, de-blocking filtering and sample adaptive offset, wherein input of the coding and reconstruction component includes the output of the micro-block matching searching coding component 1) and the original pixel samples of the input video image, output of the coding and reconstruction component includes reconstructed pixels and other coding results, and the reconstructed pixels are put into a reconstructed reference pixel sample buffer component and configured as reference pixels needed by micro-block matching coding and coding and reconstruction based on various other common technologies for a subsequent CU;

the reconstructed reference pixel sample buffer component: which temporarily stores the pixel samples of the reconstructed reference pixel sample set, that is, all reconstructed pixel samples till positions of matched current coding micro-blocks or till a position of the current coding CU in a coding process are configured as reference pixel samples of matched micro-blocks in current and subsequent coding (i.e. pixel samples of candidate matching micro-blocks), and are also configured as reference pixel samples needed by execution of coding and reconstruction operation based on various common technologies on current and subsequent CUs; and an entropy coding component (with a function the same as that of the coding component 36): which executes entropy coding operation on all coding results, including the globally-transformed DVs and the other coding results, needed to be output into a bitstream, wherein an entropy coding result, i.e. the bitstream including DV compressed data and the other coding results, is also final output of the coding device.

FIG. 18 is a structural diagram of a device for decoding according to an example embodiment of the disclosure, and as shown in FIG. 18, the whole device for decoding consists of the following components;

an entropy decoding component (with a function the same as that of the first decoding component 92): which executes entropy decoding on an input bitstream including DV compressed data and other coding results, parses semantics of various kinds of data obtained by entropy decoding, sends parsed globally-transformed DVs to an inverse global transformation component and sends parsed matching residuals and other data to a decoding and reconstruction component based oil various other common technologies;

the inverse global transformation component (with a function the same as that of the obtaining element 104); which executes inverse global transformation with each DV associated on the whole of the L globally-transformed DVs of a current decoding CU to obtain and output a group of individually-transformed DVs belonging to the CU;

an inverse individual transformation component (with a function the same as that of the obtaining element 104); which executes inverse individual transformation independent of the other individually-transformed DVs on each of the individually-transformed DVs output by the inverse global transformation component component 2) to obtain and output L DVs in an original form, i.e. original DVs;

a micro-block matching decoding component (with a function the same as that of the second decoding component 96): of which input includes the DVs output by the inverse individual transformation component 3) and which calculates positions of determined matching micro-blocks according to the DVs and positions of matched micro-blocks in current decoding in a reconstructed reference pixel sample set, copies all samples of the matching micro-blocks and moves and pastes the matching micro-blocks to the positions of the matched micro-blocks in current decoding to reconstruct the matched micro-blocks, wherein an element of the DVs is not a micro-block but a minimum coordinate element of a pixel sample (whole pixel sample or ½, ¼ and ⅛ pixel sample), output of the micro-block matching decoding component includes the pixel samples of the reconstructed micro-blocks, and the L reconstructed matched micro-blocks are combined together to form the CU;

the decoding and reconstruction component based on various other common technologies: which executes decoding and reconstruction operation based on various other common technologies such as intra prediction, utter prediction, inverse transformation, inverse quantization, compensation corresponding to prediction residuals and the matching residuals (inverse operation of residual calculation operation), de-blocking filtering and sample adaptive offset on the matched micro-blocks in current decoding or the CU in current decoding, wherein output of the decoding and reconstruction component includes reconstructed pixels (including perfectly reconstructed pixels and pixels partially reconstructed to different extents), the reconstructed pixels are put into a reconstructed reference pixel sample buffer component and configured as reference pixels needed by micro-block matching decoding operation and decoding and reconstruction operation based on various other common technologies for a subsequent CU, and the perfectly reconstructed pixels are also final output of the decoding device; and the reconstructed reference pixel sample buffer component: which temporarily stores the pixel samples of the reconstructed reference pixel sample set, that is, all reconstructed pixel samples till the positions of the matched micro-blocks in current decoding or till a position of the CU in current decoding in a decoding process are configured as reference pixel samples of matched micro-blocks in current and subsequent decoding (i.e. pixel samples of reference micro-blocks), and are also configured as reference pixel samples needed by execution of coding and reconstruction operation based on various common technologies on current and subsequent CUs.

The operation modes involved in the example embodiment of the disclosure will be described below respectively.

Embodiment about individual transformation and inverse individual transformation.

In the methods and devices for micro-block matching coding and decoding, individual transformation is a transformation represented by the following equation: $(DV1x, DV1y)=(DV0x+X, DV0y+Y)$, wherein X and Y are both global constants or partition constants, that is, a value range of (DV0x, DV0y) is divided into a limited number of areas, and for (DV0x, DV0y) in each area, X and Y are constant: and correspondingly, inverse individual transformation from the individually-transformed DV to the original DV is transformation represented by the following expression: (DV0x, DV0y)=(DV1x−X, DV1y−Y), wherein X and Y are two global constants or partition constants.

A first embodiment about global transformation and inverse global transformation In the methods or devices for micro-block matching coding and decoding, global transformation for the L DVs (actually the individually-transformed DVs) DV1, DV2, ..., DVL-1 and DVL consists of the following two steps that:

1) DVL DV2, ..., DVL-1 and DVL are re-sequenced into another one-dimensional DV array: DV[1], DV[2], DV[3], ..., DV[L-1] and DV[L] according to a predetermined re-sequencing rule; and 2) the globally-transformed DVs DVg[1], DVg[2], DVg[3], ..., DVg[L-1] and DVg[L] are obtained by the following differential operation:
DVg[1]=DV[1]−DV[0],
DVg[2]=DV[2]−DV[1],
DVg[3]=DV[3]−DV[2], ...,
DVg[L-1]=DV[L-1]−DV[1-2] and
DVg[L]=DV[L]−DV[L-1], wherein DV[0] is a DV of an adjacent or nearby CU or a micro-block therein.

Inverse global transformation consists of the following two steps that:

1) the following inverse differential operation is performed on the globally-transformed DVs DVg[1], DVg[2], DVg[3], ..., DVg[L-1] and DVg[L] to obtain DV[1], DV[2], DV[3], ..., DV[L-1] and DV[L]:
DV[1]=DVg[1]+DV[0],
DV[2]=DVg[2]+DV[1],
DV[3]=DVg[3]+DV[2], ...,
DV[LL-1]=DVg[LL-1]+DV[L-2], and
DV[l]=DVg[L]+DV[L-1], wherein DV[0] is a DV of an adjacent or nearby CU or a micro-block of the adjacent or nearby CU; and 2) DV[1], DV[2], DV[3], ..., DV[L-1] and DV[L] are inversely sequenced and reconstructed into the L DVs (actually the individually-transformed DVs) DV1, DV2, ..., DVL-1 and DVL according to an inverse sequencing rule corresponding to tire predetermined re-sequencing rule in global transformation.

A second embodiment about global transformation and inverse global transformation.

In the methods and devices for micro-block matching coding and decoding, if L=J×K is a product of two positive integers J and K, global transformation over the L DVs (actually the individually-transformed DVs) DV1, DV2, ..., DVL-1 and DVL consists of the following two steps that:

1) DV1, DV2, ..., DVL-1 and DVL are re-sequenced into a two-dimensional array form of the DVs according to a predetermined re-sequencing rule:
DV[1][1], DV[1][2], ..., DV[1][J-1], DV[1][J],
DV[2][1], DV[2][2], ..., DV[2][J-1], DV[2][J],
DV[K-1][1], DV[K-1][2], ..., DV[K-1][J-1], DV[K-1][J],
DV[K][1], DV[K][2], ..., DV[K][J-1], DV[K][J]; and 2) the globally-transformed DVs are obtained by horizontal differential operation or vertical differential operation or higher-order differential operation or matrix operation over the above two-dimensional array of the DVs, and the globally-transformed DVs are also arranged into a two-dimensional array form of the DVs.

Correspondingly, inverse global transformation consists of the following two steps that:

1) inverse horizontal differential operation or inverse vertical differential operation or inverse higher-order differential operation or inverse matrix operation is performed on the globally-transformed DVs in the two-dimensional array form; and 2) results obtained by the operation in Step 1) are inversely sequenced and reconstructed into the L DVs (actually the individually-transformed DVs) according to an inverse sequencing rule.

Embodiment about a DV Representation Format

A DV may be represented by a binary group (DVx. DVy), wherein DVx is a horizontal distance between the corresponding matching micro-block and the corresponding matched micro-block and DVy is a vertical distance between the corresponding matching micro-block and the corresponding matched micro-block. If W and H are set to be a maximum horizontal distance and maximum vertical distance between two pixels in a frame of image respectively. DVx and DVy are consistent of 0≤DVx<W and 0≤DVy<H.

A DV may also be represented by a number DVL usually called a linear distance. The DVL usually forms with DVx and DVy a relationship as follows: DVL=H×DVx+DVy or DVL=W×DVy+DVx, where H (or W) is a sufficiently large constant at least larger than a maximum of DVy (or DVx). Obviously, if DVL=H×DVx+DVy, DVx and DVy are a quotient and remainder of DVL÷H respectively. If DVL=W×DVy+DVx, DVx and DVy are a remainder and quotient of DVL÷W respectively.

Embodiment about Micro-Block Matching Accuracy

Micro-block matching may be accurate (nondestructive) matching, and then the matching residuals are 0.

Optionally, micro-block matching may also be approximate (destructive) matching, and then the matching residuals are not 0.

A plurality of embodiments about division of a CU into a group of L matched micro-blocks.

The number L of micro-blocks in a CU may be any integer from 4 to 64, and for example, L may be equal to 4, or equal to 5, or equal to 6, or equal to 7, or equal to 8, or equal to 9, or equal to 10, or equal to 11, or equal to 12, or equal to 13, or equal to 14, or equal to 15, or equal to 16, or equal to any constant from 17 to 32.

A plurality of embodiments about a bitstream including DV compressed data and other coding results.

A CU part, which is in the bitstream including the DV compressed data and the other coding results, consists of syntax elements which are loaded with the following information and sequentially arranged:

a CU header, a horizontal component of DV1, a vertical component of DV1, a horizontal component of DV2, a vertical component of DV2, ..., a horizontal component of DVL, a vertical component of DVL and the other coding results;

or the CU header, the horizontal component of DVL the horizontal component of DV2, ..., the horizontal component of DVL, the vertical component of DV1, the vertical component of DV2, the vertical component of DVL and the other coding results;

or the CU header, the other coding results, the horizontal component of DVL the vertical component of DV1, the horizontal component of DV2, the vertical component of DV2, ..., the horizontal component of DVL and the vertical component of DVL;

or the CU header, the other coding results, the horizontal component of DV1, the horizontal component of DV2, ..., the horizontal component of DVL, the vertical component of DV1, the vertical component of DV2, ..., and the vertical component of DVL;

or the CU header, the other coding results, the horizontal component of DV1, the vertical component of DV1, the horizontal component of DV2, the vertical component of DV2, ..., the horizontal component of DVL, the vertical component of DVL and more other coding results:

or the CU header, the other coding results, the horizontal component of DV1, the horizontal component of DV2, ..., the horizontal component of DVL, the vertical component of DV1, the vertical component of DV2, ..., the vertical component of DVL and more other coding results.

Micro-block matching mentioned above or below is usually called micro-block copying more. A special condition that the height of each micro-block is a pixel or pixel sample while the width is equal to the width of the coding block or decoding block is called horizontal line matching, horizontal line copying, horizontal string matching and horizontal siring copying. Another special condition that the width of each micro-block is a pixel or pixel sample while the height is equal to the height of the coding block or the decoding block is called vertical line matching, vertical line copying vertical siring matching and vertical string copying. The two special micro-block matching conditions are collectively known as line matching, line copying, string matching and string copying.

A first embodiment about special string copying condition in micro-block copying.

In the methods and devices for micro-block copying coding and decoding, the coding block or the decoding block consists of J×K pixels or pixel samples, i.e. J horizontal pixels or pixel samples and K vertical pixels or pixel samples, and is partitioned into K micro-blocks with the same size, and each micro-block is a horizontal string with J×1 pixels or pixel samples.

A second embodiment about a special string copying condition in micro-block copying.

In the micro-block copying coding and decoding methods and devices, the coding block or decoding block consists of J×K pixels or pixel samples, i.e. J horizontal pixels or pixel samples and K vertical pixels or pixel samples, and is partitioned into J micro-blocks with the same size, and each micro-block is a horizontal string with 1×K pixels or pixel samples.

Embodiment about bitstream including DV compressed data and other coding results during siring copying.

In the string copying find decoding methods and devices, a PU part in the bitstream including the DV compressed data and the other coding results consists of syntax elements which are at least loaded with the following information and sequentially arranged:

a PU header, a horizontal component of DV1, a vertical component of DV1, a horizontal component of DV2, a vertical component of DV2, ..., a horizontal component of DVL, a vertical component of DVL and the oilier coding results.

Moreover, except the PU header, arrangement sequences of the other syntax elements in the bitstream may not be unique, and any predetermined reasonable sequence may be adopted, a syntax element may also be split into several parts, and the several parts may be arranged in the same place in the bitstream in a centralized manner, and may also be placed in different places in the bitstream respectively: a plurality of syntax elements may also be combined into a single syntax element, some syntax elements may also not exist in bitstream data of a certain PU or a certain DV; and a certain syntax element may not directly exist in bitstream data but be derived from other coding or decoding parameters or variables.

A first embodiment about inverse global transformation in string copying decoding.

In string copying decoding, a DV difference form (i.e a form of the DVs after global transformation in string copying coding) is adopted for L DVs of h horizontal strings or vertical strings of a decoding block (PU) with a height or width of L pixel samples before inverse global transformation. For L DV differences DVD[1], DVD[2], ..., DVD[L-1] and DVD[L], an inverse global transformation decoding process for decoding the L DV differences DVD[1], DVD[2], ..., DVD[L-1] and DVD[L] to obtain the L DVs DV[1], DV[2], ..., DV[L-1] and DV[L] is as follows:

a DV, called a DV predicted value of the current decoding block and recorded as DVP, is obtained from ail or part of the existing DVs of an adjacent or nearby decoded decoding block or a string (micro-block) therein according to a predetermined rule, wherein the adjacent or nearby decoded decoding block includes, but not limited to, a left decoding block, a upper left decoding block, an upper decoding block and a upper right decoding block, and the existing DVs include, but not limited to, 1 to 8 historical DVs reserved in a decoding process of the decoded decoding block according to a predetermined rule, DV[1] is obtained from DVD[1] and DVP according to the predetermined rule, DV[2] is obtained from DVD[2] and DV[1] according to the predetermined rule, DV[3] is obtained from DVD[3] and DV[2] according to the predetermined rule, ..., DV[L-1] is obtained from DVD[L-1] and DV[L-2] according to the predetermined rule, and DV[L] is obtained from DVD[L] and DV[L-1] according to the predetermined rule.

A second embodiment about inverse global transformation m string copying decoding.

In string copying decoding, a DV difference form (i.e. a form of the DVs after global transformation in string copying coding) is adopted for L DVs of L horizontal strings or vertical strings of a decoding block (PU) with a height or width of L pixel samples before inverse global transformation. For L DV differences DVD[1], DVD[2], ..., DVD[L-1] and DVD[L], an inverse global transformation decoding process for decoding the L DV differences DVD[1], DVD[2], ..., DVD[L-1] and DVD[L] to obtain the L DVs DV[1], DV[2], ..., DV[L-1] and DV[L] is as follows:

DV[1]=DVD[1]+DVP,
DV[2]=DVD[2]+DV[1],
DV[3]=DVD[3]+DV[2], ...,
DV[L-1]=DVD[L-1]+DV[L-2], and
DV[L]=DVD[L]+DV[L-1], wherein DDVP is a DV selected from all or part of existing DVs of a decoded decoding block or a string (micro-block) therein according to a predetermined rule.

"Inverse global transformation" and "inverse individual transformation" in the decoding method and the decoding device correspond to "global transformation" and "individual transformation" in the coding method and the coding device. In the decoding method and the decoding device, there may actually not exist "global transformation" and "individual transformation" corresponding to "inverse global transformation" and "inverse individual transformation" Therefore, in die decoding method and the decoding device, "inverse global transformation" and "inverse individual transformation" are directly called "global transformation" and "individual transformation" more.

Obviously, those skilled in the art should know that each component or step of the disclosure may be implemented by a universal computing device, and the components or steps may be concentrated on a single computing device or distributed on a network formed by a plurality of computing devices, and may optionally be implemented by programmable codes executable for the computing devices, so that the components or steps may be stored in a storage device for execution with the computing devices, the shown or described steps may be executed in sequences different from those described here in some circumstances, or may form each integrated circuit component respectively, or multiple components or steps therein may form a single integrated circuit component for implementation. As a consequence, the disclosure is not limited to any specific hardware and software combination.

The above are only the example embodiments of the disclosure and not intended to limit the disclosure, and for those skilled in the art, the disclosure may have various modifications and variations. Any modifications, equivalent replacements, improvements and the like within the spirit and principle of the disclosure shall fall within the scope of protection of the disclosure.

INDUSTRIAL APPLICABILITY

As mentioned above, by the embodiment and the example implementation modes, the problem of low image compression and decompression efficiency during image coding and decoding in the related rat is solved, and the effect of improving image coding and decoding efficiency is further achieved.

What is claimed is:

1. A method for coding an image, comprising:
   decoding a bitstream to obtain Displacement Vectors (DVs) of micro-blocks of a decoding block, wherein each micro-block comprises a pixel row or a pixel vertical line, and the DVs are vectors between pixel positions of reference micro-blocks and pixel positions of the micro-blocks, the DVs having a vertical component DVy and a horizontal component DVx; and wherein the DVs are represented in the bitstream using a linear distance value DVL, wherein DVL=H*DVx+DVy or DVL=W*DVy+DVx, wherein H and W are predefined constants;
   determining the pixel positions of the reference micro-blocks corresponding to the micro-blocks in a preset reconstructed pixel sample set according to the DVs of the micro-blocks and the pixel positions of the micro-blocks; and
   decoding the micro-blocks according to the pixel positions of the reference micro-blocks.

2. The method of claim 1, wherein, the decoding the bitstream of the decoding block to obtain the DVs corresponding to the micro-blocks comprises:
   parsing the bitstream of the decoding block to obtain parameters of the DVs corresponding to the micro-blocks; and
   obtaining the DVs of the micro-blocks according to the parameters in at least one of manners as follows:
   performing global transformation on the parameters corresponding to part or all of the DVs of the micro-blocks in the decoding block to obtain the DVs of the micro-blocks, wherein the performing global transformation on the parameters refers to performing global transformation on all globally-transformed DVs of the decoding block to obtain a group of individually-transformed DVs; or
   performing individual transformation on the parameters corresponding to part or all of the DVs of the micro-blocks in the decoding block, wherein performing individual transformation on the parameters refers to that performing individual transformation independent of the other individually-transformed DVs on one of the individually-transformed DVs to obtain DVs.

3. The method of claim 2, wherein performing global transformation on the parameters corresponding to the DVs of the micro-blocks in the decoding block to obtain the DVs of the micro-blocks comprises:
   determining a second predicted value of the first parameter in the parameters corresponding to the DVs of the micro-blocks in the decoding block;
   determining a sum of the first parameter and the second predicted value; and
   determining a sum of the other parameters except the first parameter and the sum determined corresponding to the previous parameter.

4. The method of claim 2, wherein performing individual transformation on the parameters corresponding to the DVs of the micro-blocks in the decoding block or the parameters obtained by performing global transformation on the parameters corresponding to the DVs of the micro-blocks in the decoding block to obtain the DVs of the micro-block comprises:
   correcting, according to a second preset offset, the parameters corresponding to the DVs of the micro-blocks in the decoding block or the parameters obtained by performing global transformation on the parameters corresponding to the DVs of the micro-blocks in the decoding block.

5. The method of claim 4, wherein before correcting, according to the second preset offset, the parameters corresponding to part or all of the DVs of the micro-blocks in the decoding block or the parameters obtained by performing global transformation on the parameters corresponding to part or all of the DVs of the micro-blocks in the decoding block, the method further comprises:
   determining the second preset offset in at least one of the following manners:
   determining the second preset offset according to the parameters of the DVs; or
   determining the second preset offset according to decoded micro-blocks or decoding parameters of decoded decoding blocks.

6. An apparatus for decoding an image, comprising a hardware processor and a memory, wherein the hardware processor is configured to execute instructions stored in the memory for implementing a method comprising:
   decoding a bitstream to obtain Displacement Vectors (DVs) of micro-blocks of a decoding block, wherein each micro-block comprises a pixel row or a pixel vertical line, and the DVs are vectors between pixel positions of reference micro-blocks and pixel positions of the micro-blocks, the DVs having a vertical component DVy and a horizontal component DVx; and wherein the DVs are represented in the bitstream using a linear distance value DVL, wherein DVL=H*DVx+ DVy or DVL=W*DVy+DVx, wherein H and W are predefined constants;

determining the pixel positions of the reference micro-blocks corresponding to the micro-blocks in a preset reconstructed pixel sample set according to the DVs of the micro-blocks and the pixel positions of the micro-blocks; and decoding the micro-blocks according to the pixel positions of the reference micro-blocks.

7. The apparatus of claim 6, wherein, the decoding the bitstream of the decoding block to obtain the DVs corresponding to the micro-blocks comprises:

parsing the bitstream of the decoding block to obtain parameters of the DVs corresponding to the micro-blocks; and obtaining the DVs of the micro-blocks according to the parameters in at least one of manners as follows:

performing global transformation on the parameters corresponding to part or all of the DVs of the micro-blocks in the decoding block to obtain the DVs of the micro-blocks, wherein performing global transformation on the parameters refers to that performing global transformation on the whole of globally-transformed DVs of a Coding Unit (CU) to obtain a group of individually-transformed DVs; or performing individual transformation on the parameters corresponding to part or all of the DVs of the micro-blocks in the decoding block or parameters obtained by performing global transformation on the parameters corresponding to part or all of the DVs of the micro-blocks in the decoding block to obtain the DVs of the micro-blocks, wherein performing individual transformation on the parameters refers to that performing individual transformation independent of the other individually-transformed DVs on one of the individually-transformed DVs to obtain DVs.

8. The apparatus of claim 7, wherein performing global transformation on the parameters corresponding to the DVs of the micro-blocks in the decoding block to obtain the DVs of the micro-blocks comprises:

determining a second predicted value of the first parameter in the parameters corresponding to the DVs of the micro-blocks in the decoding block;

determining a sum of the first parameter and the second predicted value; and determining a sum of the other parameters except the first parameter and the sum determined corresponding to the previous parameter.

9. The apparatus of claim 7, wherein performing individual transformation on the parameters corresponding to the DVs of the micro-blocks in the decoding block or the parameters obtained by performing global transformation on the parameters corresponding to the DVs of the micro-blocks in the decoding block to obtain the DVs of the micro-block comprises:

correcting, according to a second preset offset, the parameters corresponding to the DV s of the micro-blocks in the decoding block or the parameters obtained by performing global transformation on the parameters corresponding to the DV s of the micro-blocks in the decoding block.

10. The apparatus of claim 9, wherein before correcting, according to the second preset offset, the parameters corresponding to part or all of the DVs of the micro-blocks in the decoding block or the parameters obtained by performing global transformation on the parameters corresponding to part or all of the DVs of the micro-blocks in the decoding block, the method further comprises:

determining the second preset offset in at least one of the following manners:

determining the second preset offset according to the parameters of the DVs;

determining the second preset offset according to decoded micro-blocks or decoding parameters of decoded decoding blocks.

11. A method for coding an image, comprising:

partitioning a coding block into L micro-blocks, wherein L is a preset number of micro-block partitions in the coding block, wherein each micro-block comprises a pixel row or a pixel vertical line;

determining Displacement Vectors (DVs) between the micro-blocks and reference microblocks in a preset reconstructed pixel sample set, wherein the DVs are vectors between pixel positions of the reference micro-blocks and pixel positions of the micro-blocks in a preset pixel coordinate system, the DVs having a vertical component DVy and a horizontal component DVx; and wherein the DVs are represented in the bitstream using a linear distance value DVL, wherein DVL=H*DVx+DVy or DVL=W*DVy+DVx, wherein H and W are predefined constants.

12. The method of claim 11, wherein before coding and writing the DVs into the bitstream, the method further comprises at least one of the followings:

performing individual transformation on the DVs of the micro-blocks in the coding block, wherein the individual transformation refers to that for one of the L DVs, performing transformation independent of the other DVs to obtain an individually-transformed DV; or performing global transformation on the DVs of the micro-blocks in the coding block or individual transformation values obtained by performing individual transformation on the DVs of the micro-blocks, wherein the global transformation refers to that for the whole of the L DVs subjected to the individual transformation, performing global transformation with the DVs associated to obtain DVs subjected to the global transformation.

13. The method of claim 11, wherein performing individual transformation on the DVs of the micro-blocks in the coding block comprises: correcting the DV s according to a first preset offset.

14. The method of claim 11, wherein performing global transformation on the DVs of the micro-blocks in the coding block or the individual transformation values obtained by performing individual transformation on the DV s of the micro-blocks comprises:

determining a first predicted value of the first DV or the first individual transformation value in the DVs of the micro-blocks or the individual transformation values;

determining a difference value between the first DV or the first individual transformation value and the corresponding first predicted value; and determining difference values between the other DVs or individual transformation values except the first DV or the first individual transformation value and previous DVs or individual transformation values of the other DVs or individual transformation values.

15. The method as claimed in claim 12, wherein before correcting the DV s according to the first preset offset, the method further comprises: determining the first preset offset in at least one of the following manners:

determining the first preset offset according to the DVs; or determining the first preset offset according to coded coding blocks or coding parameters of coded micro-blocks.

16. The method as claimed in claim 11, wherein before determining the DVs between the micro-blocks and the reference micro-blocks in the preset reconstructed pixel sample set, the method further comprises:
determining the reference micro-blocks corresponding to the micro-blocks according to a predetermined rule, wherein the predetermined rule comprises at least one of:
lossless matching under which matching residual values are 0 and lossy matching under which the matching residual values are not 0, wherein the matching residual values are difference values between pixel numerical values of the reference micro-blocks and pixel numerical values of the micro-blocks.

17. An apparatus for encoding an image, comprising a hardware processor and a memory, wherein the hardware processor is configured to execute instructions stored in the memory for implementing a method comprising:
partitioning a coding block into L micro-blocks, wherein L is a preset number of micro-block partitions in the coding block, wherein each micro-block comprises a pixel row or a pixel vertical line;
determining Displacement Vectors (DVs) between the micro-blocks and reference microblocks in a preset reconstructed pixel sample set, wherein the DVs are vectors between pixel positions of the reference micro-blocks and pixel positions of the micro-blocks in a preset pixel coordinate system, the DVs having a vertical component DVy and a horizontal component DVx; and wherein the DVs are represented in the bitstream using a linear distance value DVL, wherein DVL=H*DVx+DVy or DVL=W*DVy+DVx, wherein H and W are predefined constants.

18. The apparatus of claim 17, wherein before coding and writing the DVs into the bitstream, the method further comprises at least one of the followings:
performing individual transformation on the DV s of the micro-blocks in the coding block, wherein the individual transformation refers to that for one of the L DVs, performing transformation independent of the other DVs to obtain an individually-transformed DV; or
performing global transformation on the DVs of the micro-blocks in the coding block or individual transformation values obtained by performing individual transformation on the DVs of the micro-blocks, wherein the global transformation refers to that for the whole of the L DVs subjected to the individual transformation, performing global transformation with the DVs associated to obtain DVs subjected to the global transformation.

19. The apparatus of claim 17, wherein performing individual transformation on the DVs of the micro-blocks in the coding block comprises: correcting the DV s according to a first preset offset.

20. The apparatus of claim 18, wherein performing global transformation on the DVs of the micro-blocks in the coding block or the individual transformation values obtained by performing individual transformation on the DV s of the micro-blocks comprises:
determining a first predicted value of the first DV or the first individual transformation value in the DVs of the micro-blocks or the individual transformation values; determining a difference value between the first DV or the first individual transformation value and the corresponding first predicted value; and determining difference values between the other DVs or individual transformation values except the first DV or the first individual transformation value and previous DVs or individual transformation values of the other DVs or individual transformation values.

21. The apparatus of claim 18, wherein before correcting the DV s according to the first preset offset, the method further comprises: determining the first preset offset in at least one of the following manners:
determining the first preset offset according to the DVs; or
determining the first preset offset according to coded coding blocks or coding parameters of coded micro-blocks.

22. The method of claim 1, wherein H and W have values greater than expected largest values of DVy and DVx, respectively.

* * * * *